US007983273B2

(12) United States Patent
Beshai

(10) Patent No.: US 7,983,273 B2
(45) Date of Patent: Jul. 19, 2011

(54) HIGH-SPEED SCHEDULING APPARATUS FOR A SWITCHING NODE

(75) Inventor: Maged E. Beshai, Stittsville (CA)

(73) Assignee: Nortel Networks Limited, Mississauga, Ontario (CA)

( * ) Notice: Subject to any disclaimer, the term of this patent is extended or adjusted under 35 U.S.C. 154(b) by 63 days.

(21) Appl. No.: 12/365,995

(22) Filed: Feb. 5, 2009

(65) Prior Publication Data

US 2009/0168782 A1    Jul. 2, 2009

Related U.S. Application Data

(62) Division of application No. 11/002,580, filed on Dec. 2, 2004, now Pat. No. 7,542,473.

(51) Int. Cl.
 *H04L 12/28* (2006.01)
(52) U.S. Cl. ..................... 370/395.4; 370/413
(58) Field of Classification Search .............. 370/395.4, 370/412
See application file for complete search history.

(56) References Cited

U.S. PATENT DOCUMENTS

| 6,618,379 | B1 |  | 9/2003 | Ramamurthy |
| 6,977,935 | B2 | * | 12/2005 | Kamiya et al. ............. 370/395.4 |
| 7,023,840 | B2 | * | 4/2006 | Golla et al. ................... 370/360 |
| 7,023,865 | B2 | * | 4/2006 | Matsuoka et al. ............ 370/412 |
| 7,042,883 | B2 | * | 5/2006 | Fan et al. .................... 370/395.4 |
| 7,046,661 | B2 | * | 5/2006 | Oki et al. ..................... 370/388 |
| 7,142,546 | B2 | * | 11/2006 | Kamiya ..................... 370/395.4 |
| 7,542,473 | B2 | * | 6/2009 | Beshai ....................... 370/395.4 |
| 7,545,812 | B2 | * | 6/2009 | Barrett et al. .............. 370/395.4 |
| 7,643,493 | B1 | * | 1/2010 | Sayrafian-Pour .......... 370/395.4 |
| 2002/0110135 | A1 |  | 8/2002 | Oki |
| 2004/0213261 | A1 | * | 10/2004 | Willhite et al. ............. 370/395.4 |

* cited by examiner

*Primary Examiner* — Michael J Moore, Jr.
(74) *Attorney, Agent, or Firm* — Anderson Gorecki & Manaras LLP

(57) ABSTRACT

A scheduling apparatus for a switch includes multiple schedulers which are assigned in a variety of ways to non-intersecting control domains for establishing connections through the switch. The control domains are defined by spatial and temporal aspects. The control domains may be dynamically selected and assigned to schedulers in a manner that achieves a high throughput gain. Control domains may be considered in a cyclic and/or a pipeline discipline for accommodating connection requests. The invention enables the realization of a highly scalable controller of a switching node of fine granularity that scales to capacities of the order of hundreds of terabits per second.

17 Claims, 19 Drawing Sheets

HIGH-SPEED SCHEDULING APPARATUS FOR A SWITCHING NODE

CROSS REFERENCE TO RELATED APPLICATION

The application is a Divisional of U.S. patent application Ser. No. 11/002,580, entitled HIGH-SPEED SCHEDULING APPARATUS FOR A SWITCHING NODE, filed Dec. 2, 2004 now U.S. Pat. No. 7,542,473, which is incorporated by reference.

FIELD OF THE INVENTION

This invention is generally related to network communications switches, and more particularly to scheduling connection requests in a switch.

BACKGROUND OF THE INVENTION

Scalability is an attribute that is generally desirable in communication-network elements. Scalability refers to the extent to which a design can accommodate different capacity levels without significant design changes. Scalability also refers to the extent to which a device can be modified in the field to accommodate different levels of capacity, such as by adding or removing line cards. Scalability in design is desired by equipment providers because development of new designs can be costly. Scalability in terms of field upgrades is desired by service providers because the useful life of equipment can be extended to accommodate long term changes in traffic patterns.

The scalability of a switching node is determined at least in-part by the capacity of its traffic scheduler. The traffic scheduler controls access to the resources of the switching node. For example, the traffic scheduler manages allocation of connections across the switch fabric in a given time division multiplexing ("TDM") frame. Traffic schedulers are typically implemented with a microprocessor and supporting electronic hardware. Consequently, the capacity of the traffic scheduler, and hence the switch, is limited by the rate of function of the microprocessor. It is known to use multiple microprocessors cooperatively to increase the capacity of the traffic scheduler. However, the gain in scheduling capacity is generally not proportional to the number of microprocessors. In other words, two microprocessors provide less than twice the scheduling capacity of a single microprocessor. This limited gain is due in-part to the requirement that the function of the two processors be coordinated. Further, the effort required to coordinate the microprocessors increases as the number of microprocessors increases, i.e., per-processor capacity decreases as the number of processors increases. This is a problem because it adversely affects scalability.

SUMMARY OF THE INVENTION

In accordance with the present invention a scheduling apparatus for a switch includes multiple schedulers which are associated with non-intersecting control domains. The scheduling apparatus selects time intervals for connecting input ports to output ports. Each scheduler is independently operative to determine whether a connection request can be satisfied within a control domain associated with the scheduler. The control domains are defined by input ports, output ports, and sub-frames of a repetitive time frame. Further, control domains may be selected and assigned to schedulers in a manner that achieves even division of the scheduling load among the schedulers.

One advantage of the invention is that a relatively high per-scheduler capacity increase is achieved. In particular, the additional marginal throughput gain provided by each scheduler is near unity because the previously required coordination among processors is reduced by segregating the schedulers into non-intersecting control domains.

In accordance with an aspect of the present invention, there is provided an apparatus for facilitating establishment of a connection in a switch fabric having a plurality of input ports and a plurality of output ports in response to a connection request. The apparatus comprises multiple schedulers which are individually associated with non-intersecting control domains. Each control domain is defined by spatial aspects and a temporal aspect and each scheduler is operative to accommodate the connection request within a control domain with which the each scheduler is associated. The apparatus further includes: a plurality of domain-state memory devices each holding occupancy states of all input ports of the plurality of input ports and all output ports of the plurality of output ports during a respective sub-frame from among the non-intersecting sub-frames; and a request distributor operative to equitably distribute scheduling requests received from the plurality of input ports to the schedulers.

In accordance with another aspect of the present invention, there is provided a method for facilitating establishment of a connection in a switch fabric in response to a connection request. The method comprises steps of: receiving a connection request; forwarding the connection request to a specific scheduler from among a plurality of schedulers of a scheduling apparatus; associating the specific scheduler with a control domain from among a plurality of non-intersecting control domains; and determining, by the specific scheduler, whether the connection request can be satisfied within the control domain.

In accordance with a further aspect of the present invention, there is provided a scheduling apparatus comprising: a plurality of schedulers; a plurality of domain-state memory devices; a request distributor for apportioning scheduling requests received from a plurality of input ports of a switch among the schedulers; and a cyclic connector for pairing each of the schedulers with each of the domain-state memory devices.

In accordance with another aspect of the present invention, there is provided a scheduling apparatus comprising: a plurality of schedulers arranged in at least two groups of pipelined schedulers; a plurality of domain-state memory devices each paired with a scheduler from among the plurality of schedulers; a plurality of scheduling-requests buffers each connecting to a front scheduler of a corresponding group of pipelined schedulers; and a request distributor for apportioning scheduling requests received from a plurality of input ports of a switch among the scheduling-requests buffers. The apparatus further includes a channel from one scheduler of each group of pipelined schedulers to one of the scheduling-requests buffers of a subsequent group of pipelined schedulers, thereby forming a ring of the groups of pipelined schedulers.

BRIEF DESCRIPTION OF THE DRAWINGS

In order to facilitate a clearer understanding of the present invention, reference is now made to the appended drawings. These drawings should not be construed as limiting the present invention, but are intended to be exemplary only.

DETAILED DESCRIPTION OF EXEMPLARY EMBODIMENTS

Terminology

Figure 1:
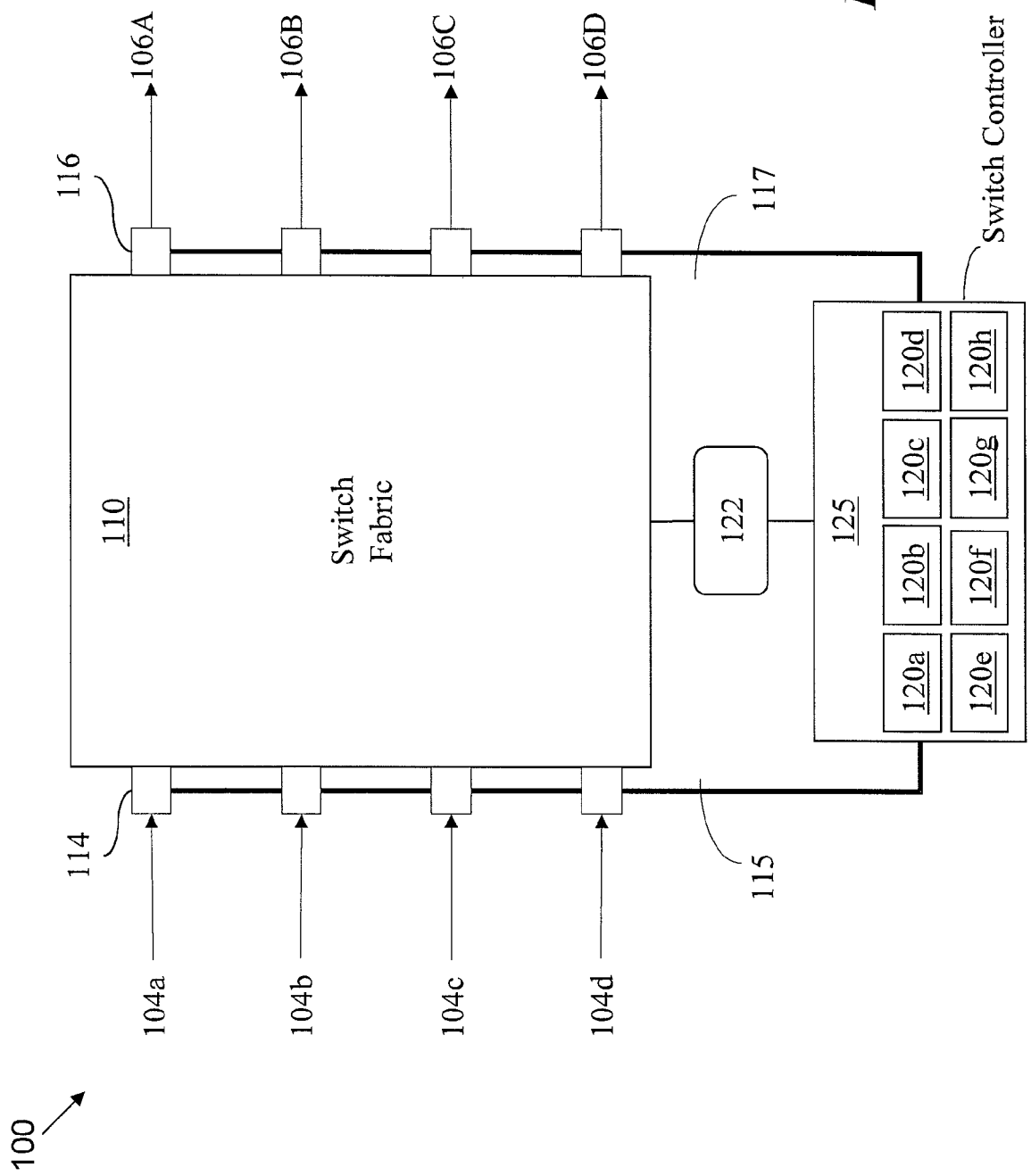
FIG. 1 illustrates a space switch that utilizes a controller having multiple schedulers.

The terminology used in describing the embodiments of the invention is listed below.

Control space: Herein, a control space is a multi-dimensional representation of variables that relate to the operation of a shared facility. In this disclosure, the control space relates to a telecommunications switch and is limited to a three-dimensional representation of input ports of the switch, output ports of the switch, and a repetitive time frame used for scheduling paths through the switch in response to connection requests received at the input ports. In a slotted time frame having a predefined number of time slots, the control space contains a number of elements each representing an input port, an output port, and a time slot.

Control block: The control space comprises control blocks, each block covering a subset of the input ports (an input-port group), a subset of the output ports (an output-port group), and a sub-frame of the time frame (in a slotted time frame having a predefined number of time slots, the sub-frame comprises a subset of the time slots).

Control domain: A control domain is a portion of the control space that may be allocated to a single processor (scheduler) for sequential processing of connection requests. The smallest control domain is a control block. A control domain may be identified using the notation $\{A, B, C\}$ where 'A' denotes an input-port group, 'B' denotes an output-port group, and 'C' denotes a sub-frame including at least one time slot in a time-slotted frame.

Non-intersecting domains: Any two control domains that have no common element are non-intersecting.

Connection request: An input port of a switch may receive requests from subordinate sources to allocate resources to a specified destination. Alternatively, an input-port processor may monitor the behavior of its subordinate sources and generate resource-allocation requests. A connection request may be rejected by a switch controller for a variety of reasons that are not relevant to the present disclosure. In either case, a request to allocate resources in a switch is herein called a connection request.

Scheduling request: When a connection request is accepted by a switch controller, the controller issues a scheduling request to an associated scheduling apparatus. The scheduling request specifies an input port, at least one output port, and a requisite capacity allocation. The requisite capacity allocation need not equal the capacity allocation specified in the connection request; a switch controller may modify the specified capacity request.

Scheduler: A scheduler is a processing unit that receives a stream of connection requests, processes the connection requests sequentially, and attempts to find a number of free elements in a control domain to satisfy a requisite capacity specified in each connection request. The internal structure of a scheduler depends largely on the switch fabric.

Scheduler apparatus: The term is used herein to denote a device that includes two or more schedulers.

Throughput gain: In a scheduling apparatus employing a number of identical schedulers, the ratio of the throughput (weighted number of scheduling requests per second) of the scheduling device to the throughput that would be realized using only one scheduler is called a "throughput gain".

Marginal throughput gain: This is the increase in scheduling throughput, realized by adding a scheduler to a scheduling apparatus, divided by the throughput that would be realized using only one scheduler.

Request distributor: A request distributor is a device that receives a stream of scheduling requests and distributes the requests evenly among a number of schedulers. The requests may be weighted according to their resource requirements; for example a request to schedule four time slots per time frame may be treated as four basic requests, where a basic request specified only one time slot per time frame.

Cyclic connector: A cyclic connector is a device that connects each of a plurality of inlets to each of a plurality of outlets during each time frame.

Scheduling cycle: The schedulers of a scheduling apparatus collectively cover the entire control space once every repetitive scheduling cycle. The duration of a repetitive scheduling cycle need not bear any rational relationship to the duration of the time frame partly defining the control space. However, it may be advantageous to devise a scheduling cycle having a duration that is an integer multiple of the duration of the time frame. The ratio of the scheduling-cycle duration to the time-frame duration is a design parameter that depends largely on the dimension of the switch and rate of connection-request generation. In the present disclosure, the duration of the scheduling cycle is selected to equal the duration of the repetitive time frame.

Scheduling phase: The scheduling cycle is divided into a number of scheduling phases of equal durations. During a scheduling phase, each scheduler, or each of designated scheduler groups, is exclusively associated with a control domain. The duration of a scheduling phase should be sufficient to process at least one connection request. Preferably, the duration of a scheduling-phase should be sufficient to process a relatively large number of scheduling requests. A scheduling phase may be referenced as a "phase" for brevity.

Occupancy state: An element in the control space has an occupancy state of 1 if the corresponding input port and output port are in use during the corresponding time slot and an occupancy state of 0 otherwise.

Domain state: The set of occupancy states of all elements in a control domain is referenced as a domain state.

Domain-state memory device: A memory device, or a number of memory devices, holding a domain state is herein called a domain-state memory device. A domain-state memory device may comprise two separate memory devices one storing an array of occupancy state of each input port during each time slot within a given control domain, and the other storing an array of occupancy state of each output port during each time slot in the time frame within the given control domain.

Sub-frame: A segment of a repetitive time frame is a sub-frame. In a slotted time frame, a sub-frame includes a number of time slots.

Resource Scheduling

A scheduling process in a shared facility allocates resources of the shared facility to demands so that a resource may only be allocated to a single demand. In a switching node having input ports, output ports, and a switching fabric for connecting the input ports to the output ports, the resources may include spatial and temporal resources. The spatial resources may include internal input-output paths through the switching fabric. The temporal resources may include time slots in a predefined repetitive time frame. In a single-stage switching fabric, an internal path is defined solely by an input port and an output port. In a unicast single-stage switching fabric, any two internal paths relate to different input ports and different output ports. In a multi-cast switching fabric, two or more internal paths may have a common input port.

In a switch fabric configured in a multi-stage structure or a mesh structure, an input port 114 may have several internal paths to an output port 116 and the internal paths for different pairs of input and output ports may intersect.

The throughput of a scheduling apparatus of a shared facility, i.e., the rate at which demands for resources can be processed, depends on many factors such as the complexity of the structure and operation of the shared facility. It is known to use multiple processing units to increase the throughput of any processing apparatus. It is also well known that the resulting throughput increase may not be proportionate to the number of processors due to time-waste caused by resource contention.

Hereinafter, the mean processing throughput of a multi-processor system employing a plurality of processors is defined as the total processing throughput divided by the number of processors. In the case of a multi-processor scheduling apparatus of a switch, where the scheduling apparatus comprises a plurality of schedulers, the throughput is determined in terms of the number of processed connection requests per second. A connection request may specify multiple time slots per time frame and the scheduling effort naturally increases with the number of requested time slots per frame. The throughput may then be defined in terms of the number of time slots scheduled per second. The throughput gain of a multi-processor system is defined herein as the ratio of the total processing throughput to the throughput of a system employing a single processor and serving the same demands. The processing efficiency is the ratio of the mean processing throughput to the mean throughput of the single processor. It is well known that the throughput gain is typically not proportional to the number of processors, i.e., the processing efficiency is typically less than unity when two or more processors operate within the same control space, with potential contention in accessing memory devices containing the occupancy state of resources. The methods and apparatus of the present invention substantially increase the throughput gain of a scheduling apparatus comprising multiple schedulers.

Scheduling data transfer across a space switch requires arbitration among input ports of the space switch vying for common output ports. The arbitration effort in a space switch of large dimension can be excessive, thus limiting the scalability of the switch. To circumvent this limitation, Applicant developed a method and apparatus for spatial-temporal disengagement, where arbitration is replaced by a simple occupancy-state examination, as described in U.S. Pat. No. 5,168,492, issued on Dec. 1, 1992 to Beshai et al., and titled "Rotating Access ATM-STM Switch", the specification of which is incorporated herein by reference. The method is based on concurrent cyclical pipelined time-slot allocation where, during each time slot in a rotation cycle, each of the input ports may transfer to a transit memory a data unit destined for any output port that is not yet reserved. A similar pipelined round robin scheduler for fast input buffered packet switches is described in U.S. Pat. No. 6,618,379, issued on Sep. 9, 2003 to Ramamurthy et al., and titled "RRGS-round-robin greedy scheduling for input/output terabit switches". An extension of the scheduling method of U.S. Pat. No. 5,168,492, mentioned above, is described in U.S. Pat. No. 5,745,486 issued to Beshai et al. on Apr. 28, 1998 and titled "High Capacity ATM switch", the specification of which is incorporated herein by reference.

The scheduling methods described in the above patents reduce the processing effort and, hence, increase the capacity of associated switching nodes relative to other scheduling methods that are based on contention resolution. The present invention adds two main features. The first is scheduling load equalization among multiple processors of a scheduling apparatus. The second is the use of partitioned circular pipelines which significantly increases the throughput of the scheduling apparatus.

FIG. 1 illustrates a communications switch 100 that includes a switch fabric 110, input ports, referenced individually or collectively as 114, output ports, referenced individually or collectively as 116, a connectivity circuit 122, and a switch controller 125. Connectivity circuit 122, under control of switch controller 125, causes the switch fabric 110 to connect any input port 114 to any output port 116. Each input port 114 receives signals from an input channel 104 and each output port 116 transmits signals over an output channel 106. Control channel 115 conveys control information from input ports 114 to controller 125 and from controller 125 to input ports 114. Likewise, control channel 117 may convey control information from the output ports 116 to controller 125 and from controller 125 to output ports 116. The switch fabric 110 is operative to provide selective interconnection between four input ports 114a-114d and four output ports 116A-116D. In particular, the switch controller 125 is operative to determine the configuration of the switch fabric 110 to provide the requisite connectivity between input ports 114 and output ports 116 to satisfy connection requests. In particular, in successive time slots in a repeating time frame, the spatial connectivity between input ports 114a-114d and output ports 116A-116D can be reconfigured. Those skilled in the art will recognize that any number of input ports 114 and output ports 116 may be utilized, but the illustrated embodiment shows only four input ports and four output ports for simplicity. In addition to switching in space, the switch fabric may switch in time. The present invention facilitates the operation of a switch 100 that may scale from a small dimension, of 16×16 for example, to a large dimension, of the order of 16384× 16384 for example.

Control Space

Figure 2:
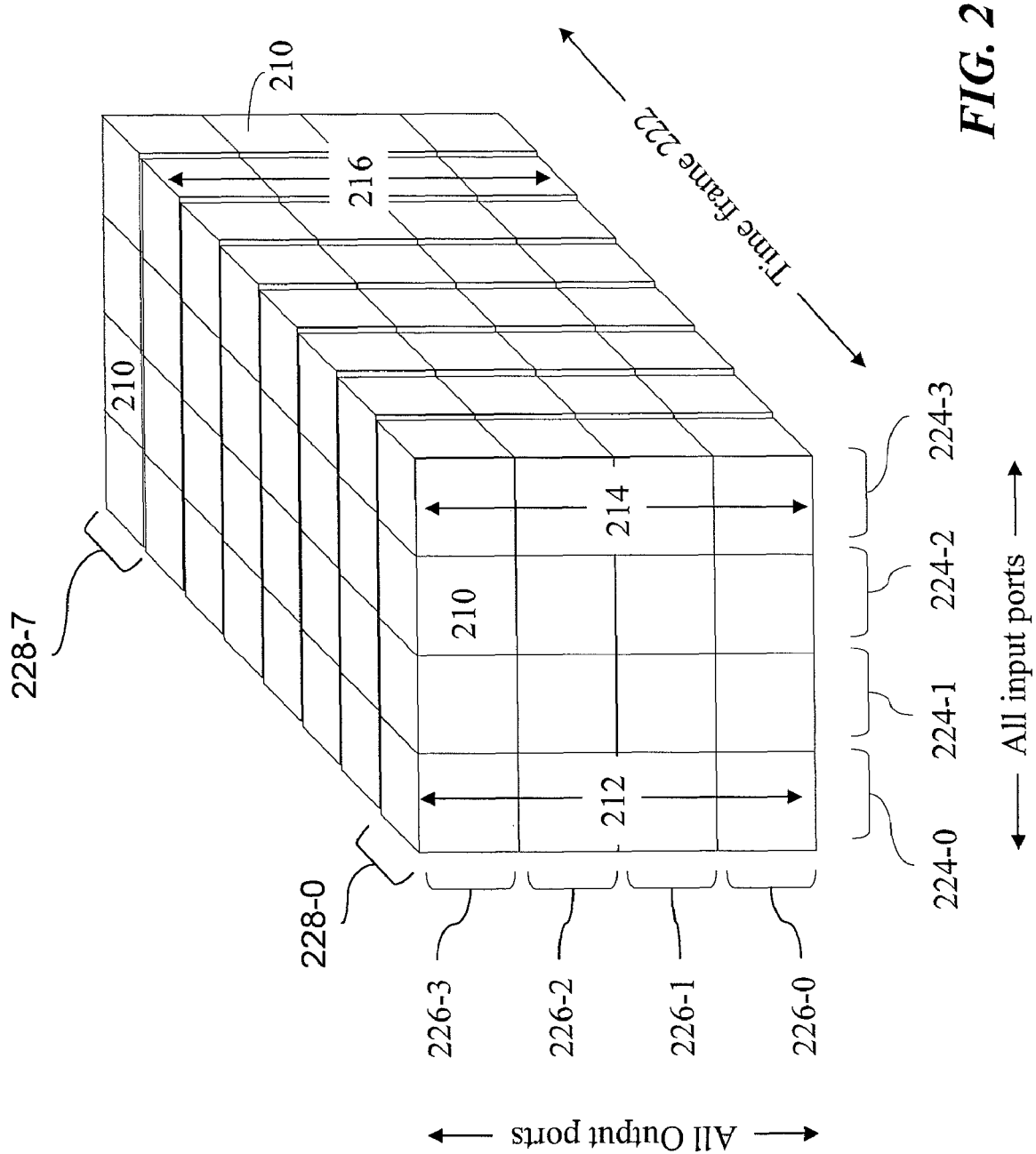
FIG. 2 illustrates a three-dimensional control space, of the switch of FIG. 1, including input ports, output ports, and a slotted time frame.

FIG. 2 illustrates the control space 200 in a node 100 operated in a time-slotted mode. The control space is defined by the input ports 114, output ports 116, and a time frame 222. The input ports 114 may be grouped into input-port groups 224 each including a predefined number of input ports. Likewise, the output ports 116 may be grouped into output-port groups 226 each including a predefined number of output ports. The time frame 222 may be divided into time-slot groups 228, also called sub-frames, each including a number of time slots. The control space 200 may then be divided into control blocks 210 each defined by an input-port group 224, an output-port group 226, and a sub-frame 228. FIG. 2 illustrates a division of control space 200 into 128 control blocks 210 defined by four input-port groups 224-0 to 224-3, four output-port groups 226-0 to 226-3, and eight sub-frames 228-0, to 228-7. Control domains may be formed to contain several control blocks 210. Two or more control blocks 210 are said to be non-intersecting if they are defined by different input-port groups 224, different output-port groups 226, and different sub-frames 228.

The switch controller 125 includes a plurality of schedulers 120 collectively forming a scheduling apparatus. Eight schedulers 120 are illustrated in FIG. 1 as 120a to 120-h. However, any number of schedulers 120 may be provided. Each scheduler 120 is operative to schedule connections across the switch fabric 110 by processing connection requests and communicating with connectivity-control circuit 122 which configures the switch fabric. Each scheduler 120 processes scheduling requests sequentially and, hence, its operation is contention free. Multiple schedulers 120 may operate concurrently and independently on non-intersecting control domains.

The switch is configured such that the schedulers 120 are associated with non-intersecting control domains, and only one of the schedulers has responsibility for scheduling connection within a particular control domain. Each scheduler 120 is independently operative to determine whether a connection request can be satisfied within the control domain associated with the scheduler. Further, the scheduling apparatus comprising a set of schedulers 120 is operative to instruct connectivity circuit 122 to configure the switch fabric 110 to accommodate a connection request if the request can be accommodated. Because the schedulers are associated with non-intersecting control domains, the normally requisite coordination among processors is reduced relative to prior art techniques. In particular, there is a near unity throughput gain for each scheduler added to the switch controller. Consequently, scalability is enhanced.

Switch 100 may operate in a time-division-multiplexed (TDM) fashion using a time frame 222 of a predefined number of time slots. The granularity of switch 100 is determined by the number of time slots per time frame. For example, if the carrier in each input channel 104 is modulated at 10 Gb/s (gigabits per second), and if the time frame is divided into 1024 time slots, the granularity, i.e., the lowest flow rate to be assigned to a data stream, would be approximately 10 Mb/s (megabits per second). It may be desirable, however, to provide a finer granularity, of 1 Mb/s for example, which necessitates a time frame having approximately 10,000 time slots.

Naturally, increasing the number of time slots per time frame while keeping the frame duration at a constant value increases the scheduling effort. The scheduling effort decreases with increasing the frame duration. However, a time frame 222 of large duration is undesirable because it introduces a large delay. Consider, for example, a switch 100 having 1024 input ports 114 and 1024 output ports 116 with each port, input or output, operating at 10 Gb/s. The total capacity of the switch is approximately 10 Tb/s (terabits per second). With a granularity of 1 Mb/s, the number of simultaneous flows could be as high as 10 millions and the number of time slots per time frame would be 10,000 (10 Gb/s divided by 1 Mb/s). With a time-slot duration of 100 nanoseconds, for example, the time-frame duration would be 1 millisecond. Using a time-slot duration of 1 microsecond, reduces the scheduling effort by an order of magnitude but increases the time-frame duration to 10 milliseconds which may be considered too high. In a load-adaptive network, the capacity allocated for a connection may vary continuously, every fraction of a second for example, to follow temporal traffic variation and hence realize efficient use of network resources. This may result in a scheduling request rate of the order of several million requests per second.

Because each input port 114 in switch 100 may transmit to several output ports 116 during a time frame, hence each output port 116 may receive from many input ports 114 during the time frame, vacant time slots at a given pair of input port and output port may not be aligned. The misalignment of vacant time slots is often referenced as a 'mismatch'. A known process of temporal packing significantly reduces the mismatch probability. However, this is realized at the expense of an extensive search effort because the search in a packing scheduling process must start from the same reference time slot for each connection request (hence each scheduling request) and the required number of vacant time slots is then more likely to be found near the end of the time frame period.

Occupancy-state arrays may be used to track the occupancy state of each input port 114 and each output port 116 over a period of a time frame 222. If the number of time slots per TDM frame is 8192, and with a high mean occupancy of 0.90, for example, a large proportion of connection requests would require scanning more than 6400 entries of occupancy-state arrays associated with an input port 114 and an output port 116 specified in a connection request. This extensive search can significantly reduce the scalability of the scheduling apparatus and, hence, limit the input capacity of switch 100.

To circumvent this difficulty, the control space 200 may be divided into non-intersecting control domains, as described above with reference to FIG. 2, in order to permit concurrent use of multiple schedulers 120. A scheduler processes one request at a time and, hence, resources are assigned uniquely and without conflict to each request. However, when two or more schedulers are used, it is imperative to ensure that any two schedulers do not assign the same resource to different requests. As described above, a resource is a unit in any of the three dimensions of the control space 200, i.e., an input port, an output port, or a time slot. It is important to note that time is treated herein as a resource. Two control domains are said to be non-intersecting if they do not have a common resource. For example, control domains defined by any two columns, such as 212 and 214, in an input-output plane (i.e., of the same sub-frame) in control space 200 would have disjoint input-port groups but common output ports. Hence the two control domains defined by columns 212 and 214 are intersecting domains and may not be associated with different schedulers 120. A scheduler operating within one of the two control domains and a scheduler operating within the other control domain may coincidentally schedule an output port for two concurrent connections. However, domains defined by any two columns, such as 212 and 216, in different input-output planes are naturally non-intersecting.

Figure 3:
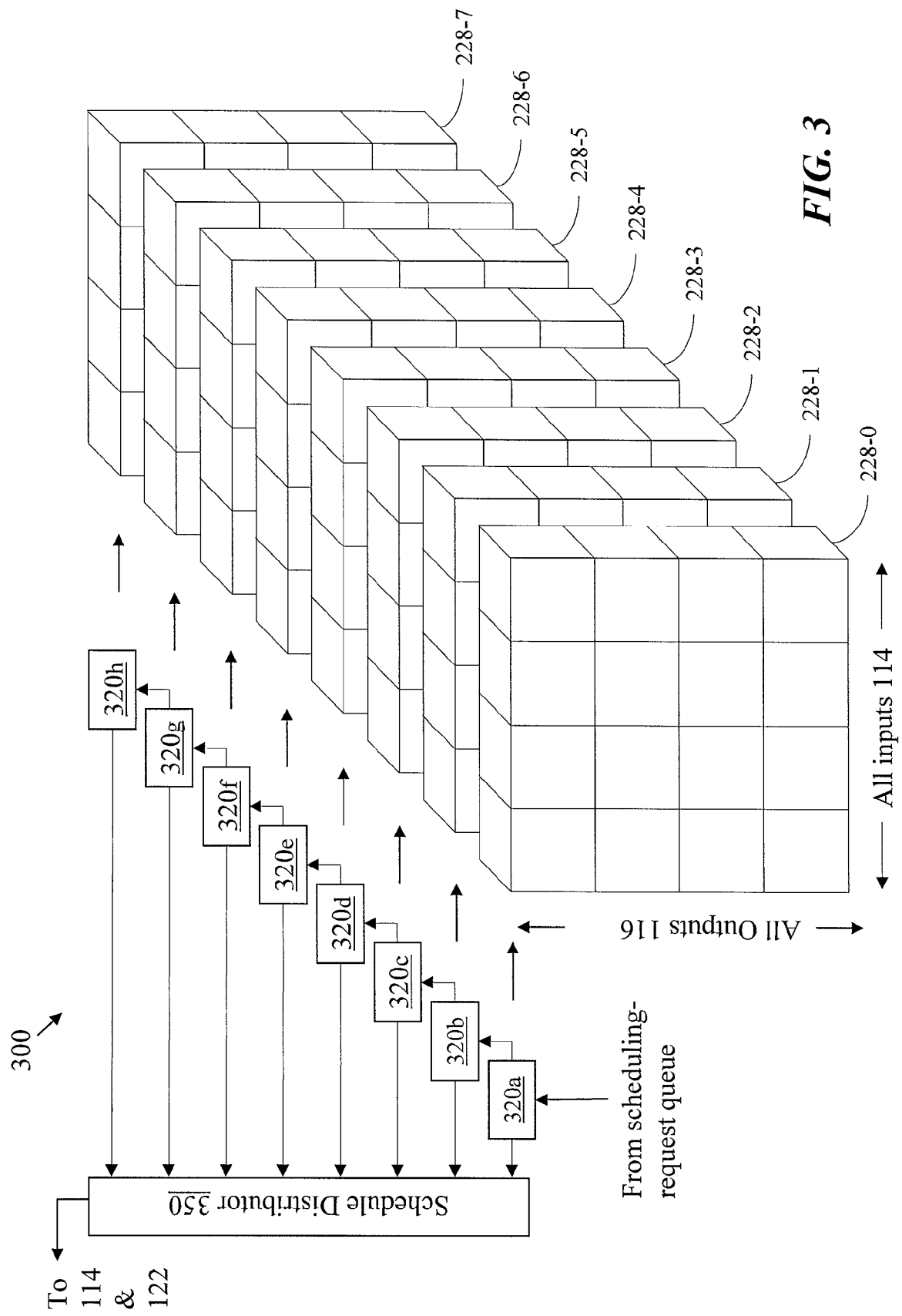
FIG. 3 illustrates a method of dividing the control space of FIG. 2 into non-intersecting control domains and assigning the switch schedulers to the non-intersecting control domains using one scheduler per control domain where each control domain covers all input ports, all output ports, and a sub-frame in a repetitive time frame.

Several ways may be devised to divide the control space 200 into non-intersecting domains and assign a scheduler for each. FIG. 3 illustrates one way to assign the switch schedulers 320 (corresponding to schedulers 120 of FIG. 1) to non-intersecting control domains. In this embodiment the control domains are defined by sub-frames 228, each including all input ports 114 and all output ports 116, and one scheduler is assigned per sub-frame 228 in a pipelined fashion. A sub-frame may include any subset of time slots and may be limited to only one time slot. Consequently, scheduler 320a is operative to scheduler connections between all input ports and all output ports that would be effected during sub-frame 228-0. Similarly, scheduler 320b is operative to scheduler connections between all input ports and all output ports that would be effected during time-slot range 228-1. The result is a pipelined process in which each new connection request is first processed by front scheduler 320a. If scheduler 320a is unable to accommodate the requested connection, the request is passed to scheduler 320b. If scheduler 320b is unable to accommodate the requested connection then the request is passed to scheduler 320c. This procedure continues until a scheduler 320 is able to accommodate the request or a determination is made that none of the schedulers 320 is able to accommodate the request. It is noted that pipelining has two main attributes: firstly it permits concurrent operation of two or more schedulers and, secondly, it tends to pack allocated time slots into the control domains associated with the front-end schedulers starting with scheduler 320a. Packing is a desirable property because it increases the likelihood that later connection requests be satisfied in relatively free control domains at the end of the pipeline in comparison with a scheduler apparatus that examines time slots in a random fashion. However, it will be recognized that throughput may be limited by the most heavily loaded scheduler in the pipeline. The use of occupancy packing in a bufferless multi-stage switch is described in Applicant's U.S. patent application Ser. No. 10/223,222, filed on Aug. 20, 2002 and titled "Modular high-capacity", the specification of which is incorporated herein by reference.

Figure 4:
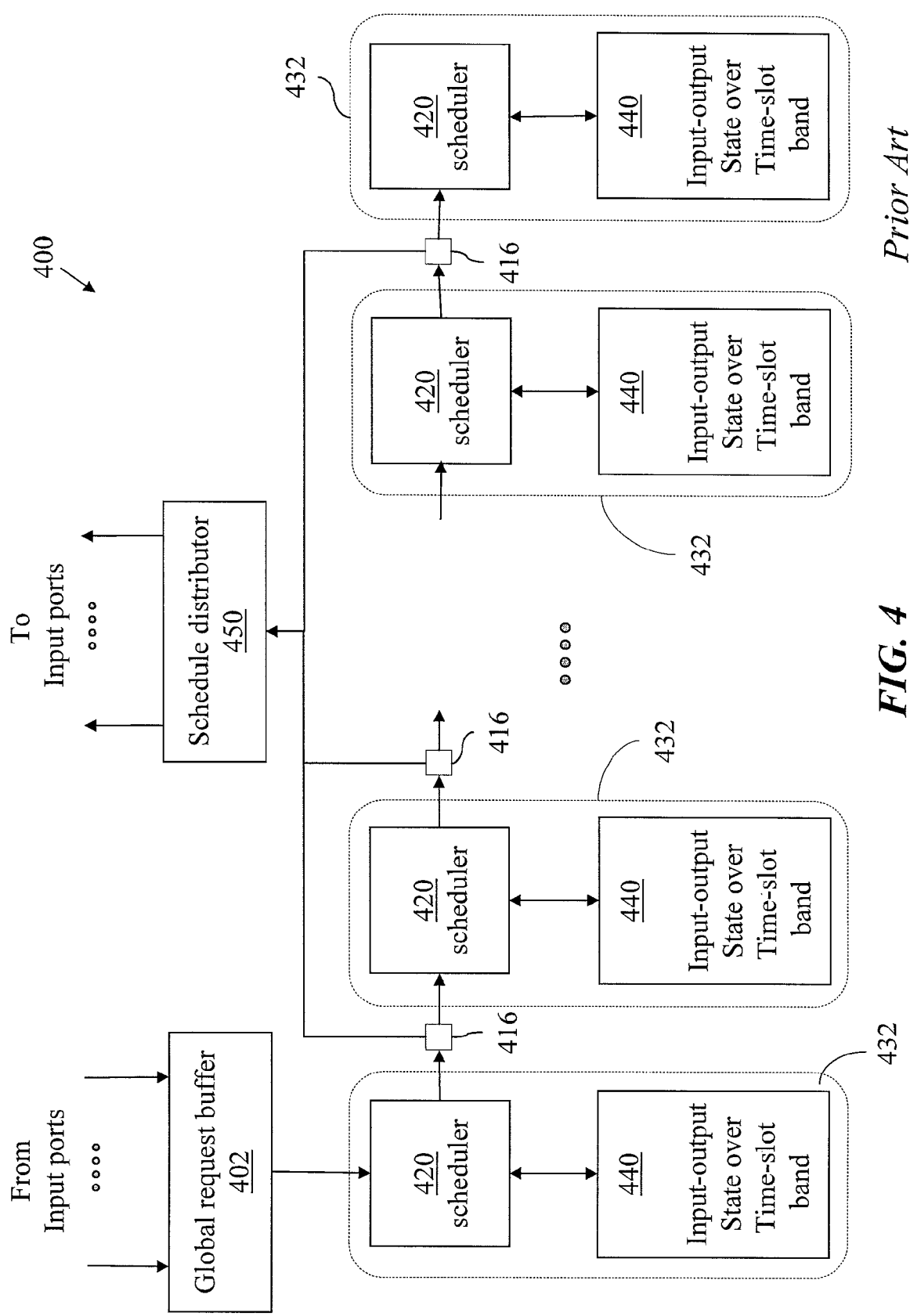
FIG. 4 illustrates a prior-art scheduling apparatus employing pipelines schedulers.

FIG. 4 illustrates an apparatus 400, similar to an apparatus disclosed in patent application Ser. No. 10/223,222. Apparatus 400 comprises pipelined schedulers where each scheduler covers a predefined sub-frame 228, i.e., a range of time slots in a scheduling time frame. The sub-frames need not be of equal duration. The connection requests from all inputs are accumulated in a global request buffer 402, which may be implemented as a bank of memories to expedite processing. The global request buffer 402 may actually include separate buffers, one per input port 114, and a cyclic selector may scan the buffers to read waiting scheduling requests, if any. A cascade of schedulers 420, each of which associated with a control domain may be used to realize a high scheduling throughput. Each scheduler 420 in this cascaded (pipelined) structure is provided with a result buffer 416 to hold information on allocated time slots within a respective sub-frame. The result buffer 416 may also hold the parameters of a connection request to be relayed to a subsequent scheduler 420, if any. A schedule distributor 450 cyclically visits the result buffers 416 of the schedulers 420 to read the records of allocated time slots. Each scheduler 420 uses memory devices 440 to hold occupancy-state arrays indicating the busy/idle state for each input port 114 and each output port 116 for a sub-frame associated with the scheduler. The occupancy-state arrays are needed to facilitate the path scheduling process. Each entry in the occupancy-state array need only be one-bit wide.

Using multiple cascaded schedulers 420, a connection request requiring a number of time slots per time frame is offered to the front scheduler which attempts to find matching time slots within the first sub-frame and relays the connection request, with the pending number of time slots, to a second scheduler if the pending number is greater than zero. The second scheduler attempts to find matching time slots along the path from input to output and relays the connection request to a third scheduler if the pending number of time slots is not zero, and so on. This process permits simultaneous operation of schedulers where the schedulers would concurrently process different connection requests.

The schedule distributor 450 transfers the results of all schedulers 420 to the input ports 114 and to connectivity-control circuit 122 associated with the switch fabric 110. A path-search attempt may terminate successfully at any scheduler. Notably, while the time-slot-allocation requests arrive sequentially, successive time-slot-allocation requests may terminate concurrently at different schedulers 420. Each scheduler 420 therefore may use the result buffer 416 to store identifiers of allocated time slots. Alternatively, each result buffer 416 may store an identity, such as a cyclical request number, that points to a result record, where the record includes attributes of the path selected to satisfy the connection request. The schedule distributor 450 visits the result buffers 416 and, under control of a dequeue circuit (not illustrated), reads the content, if any, of each result buffer 416 and transfers the content to the connectivity-control circuit 122.

Scheduling Phases

During any time slot of a time frame, the schedulers of the scheduling apparatus may be associated with different control domains. A pattern of pairing the schedulers with control domains is herein called a "scheduling phase", or simply "phase". Several phases may be configured within a scheduling cycle, which is herein selected to have a duration equal to the duration of the repetitive time frame 222.

Cyclical Pairing of Input-Port Groups and Sub-Frames

Figure 5:
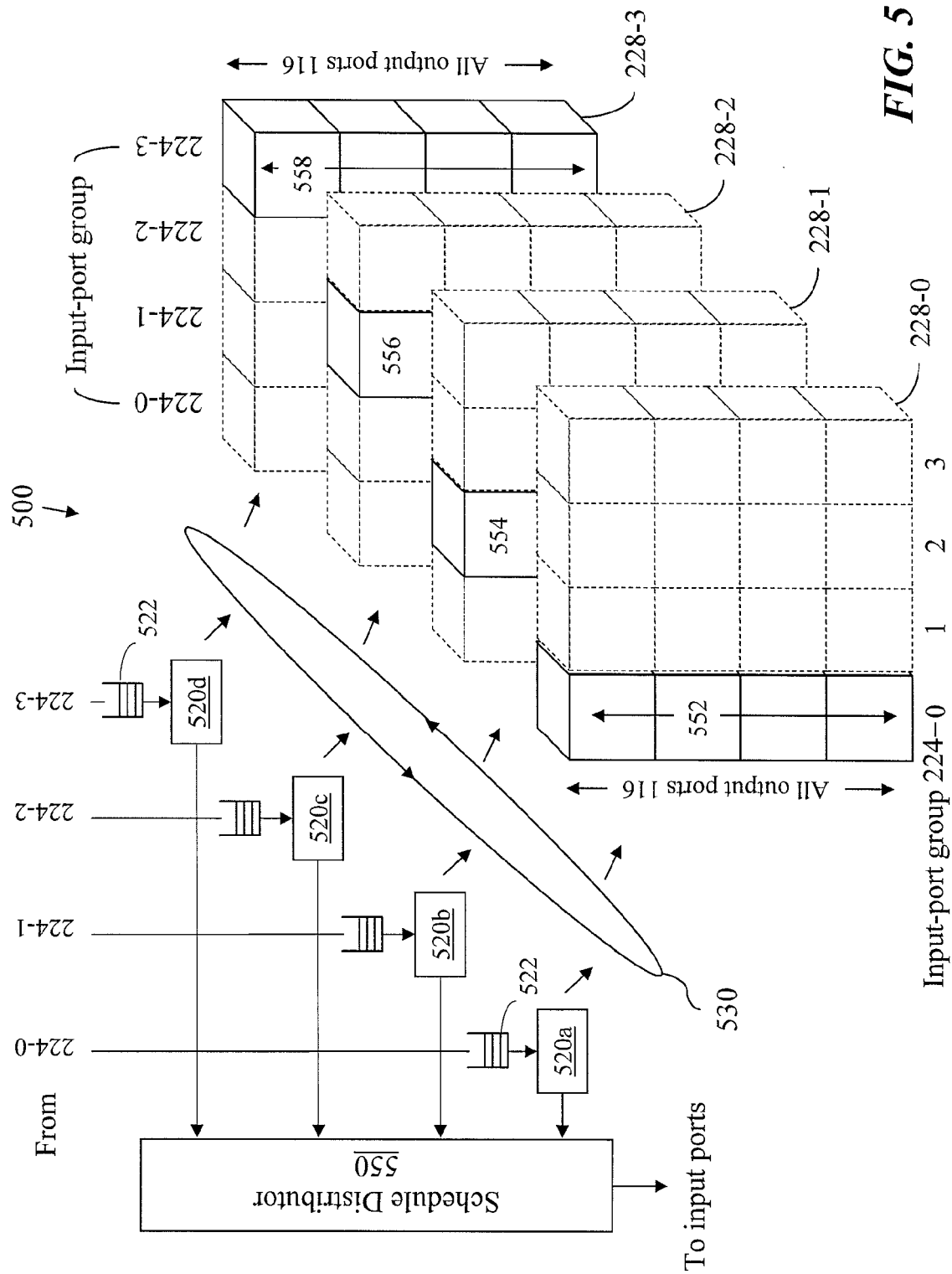
FIG. 5 illustrates an alternative method of dividing the control space of FIG. 2 into non-intersecting control domains and assigning a scheduler to each control domain, with each control domain covering an input-port group, all output ports, and a sub-frame in a slotted time frame, in accordance with an embodiment of the present invention.

FIG. 5 is a schematic of a scheduling apparatus 500 using an alternative way to assign switch schedulers 520 (corresponding to schedulers 120 of FIG. 1) to non-intersecting control domains. Four schedulers 520a, 520b, 520c, and 520d are illustrated. In this embodiment each of the control domains is defined by an input-port group 224, all output ports 116, and a sub-frame 228 (as described above, a sub-frame is a time-range within the time frame), and one scheduler 520 is employed per input group. A scheduler 520 associated with a specific input group 224 is cyclically associated with control domains defined by the specific input-port group 224, all output ports 116, and a sub-frame 228 in the time frame 222. Scheduler 520a receives scheduling requests generated at input ports 114 within input-port group 224-0; scheduler 520b receives scheduling requests from input ports 114 within input-port group 224-1, and so on. A buffer 522 may be placed with each scheduler 520 in order to hold scheduling requests to be processed. Cyclic connector 530 allows each scheduler 520a, 520b, 520c, or 520d to operate within successive control domains during successive scheduling phases. Control domains 552, 554, 556, and 558 are respectively associated with schedulers 520a, 520b, 520c, and 520d during the first scheduling phase of a scheduling cycle.

The four successive control domains associated with scheduler 520a are defined by {input-port group 224-0, all output ports 116, sub-frame 228-0}, {input-port group 224-0, all output ports 116, sub-frame 228-1}, {input-port group 224-0, all output ports 116, sub-frame 228-2}, and {input-port group 224-0, all output ports 116, sub-frame 228-3}. The successive control domains associated with scheduler 520b are defined by {input-port group 224-1, all output ports 116, sub-frame 228-1}, {input-port group 224-1, all output ports 116, sub-frame 228-2}, {input-port group 224-1, all output ports 116, sub-frame 228-3}, and {input-port group 224-1, all output ports 116, sub-frame 228-0}. The successive control domains for schedulers 520c and 520d are likewise determined.

Figure 6:
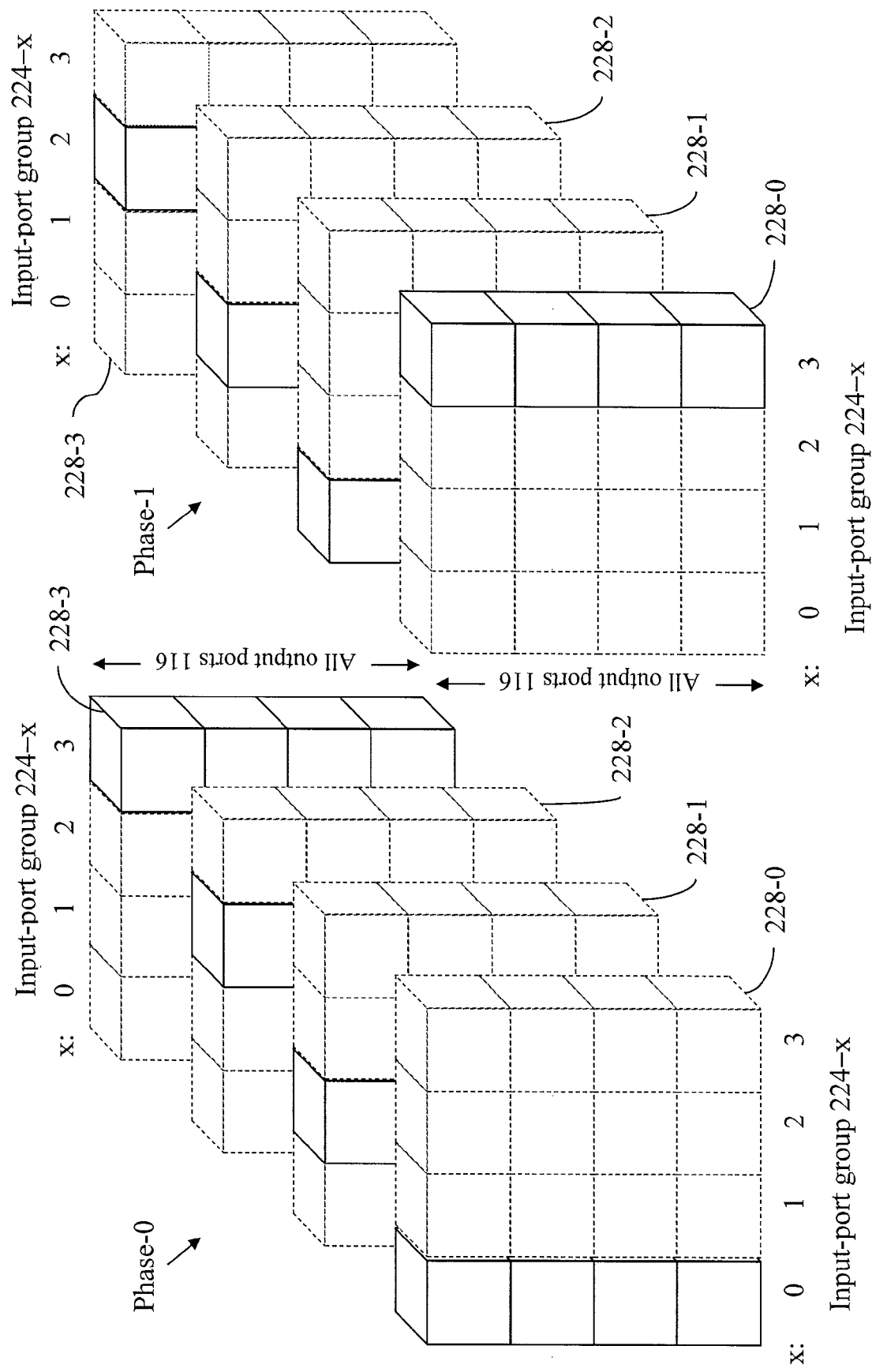
FIG. 6 illustrates an association of schedulers with the control domains of FIG. 5 during successive sub-frames.

FIG. 6 illustrates the control domains, as defined above with reference to FIG. 5, associated with each of the four schedulers 520a-520d during two successive scheduling phases, phase-0 and phase-1. During scheduling phase 0, scheduler 520a operates within the control domain defined by input-port-group 224-0, all output ports 116, and time-range 228-0. During scheduling phase 1, scheduler 520a operates within the control domain defined by input-group 224-0, all output ports 116, and sub-frame 228-1. During scheduling phase 0, scheduler 520b operates within the control domain defined by input-port-group 224-1, all output ports 116, and sub-frame 228-1. During scheduling phase 1, scheduler 520b operates within the control domain defined by input-group 224-1, all output ports 116, and sub-frame 228-2. Likewise, during scheduling phase-0, schedulers 520c and 520d are respectively associated with the control domains {input-port-group 224-2, all output ports 116, sub-frame 228-2}, and {input-port-group 224-3, all output ports 116, sub-frame 228-3}, and during scheduling phase 1, schedulers 520c and 520d are respectively associated with the control domains {input-port-group 224-2, all output ports 116, sub-frame 228-3}, and {input-port-group 224-3, all output ports 116, sub-frame 228-0}.

The number of phases within a scheduling cycle equals the number of control domains. During phase-0, scheduler 520a attempts to accommodate a connection request received from an input port 114 belonging to input-port group 224-0 within control domain 552 (FIG. 5). If during phase-0 the number of allocated time slots for a connection is less than a number of time slots specified for the connection, scheduler 520a attempts during subsequent phase-1 to allocate the remaining number of time slots within a control domain {224-0, 116, 228-1}, and so on. Similarly, during phase-0, scheduler 520d attempts to accommodate a connection request received from an input port 114 belonging to input-port group 224-3 within control domain 558 (FIG. 5). If during phase-0 the number of allocated time slots for a connection is less than a number of time slots specified for the connection, scheduler 520d attempts during subsequent phase-1 to allocate the remaining number of time slots within a control domain {224-3, 116, 228-0}, and so on. A connection may be scheduled during two or more scheduling phases within a scheduling cycle. This procedure continues in a cyclic fashion until, within a scheduling cycle, a scheduler is able to accommodate the request or a determination is made that none of the schedulers is able to accommodate the request.

Cyclical Pairing of Output-Port Groups and Sub-Frames

Figure 7:
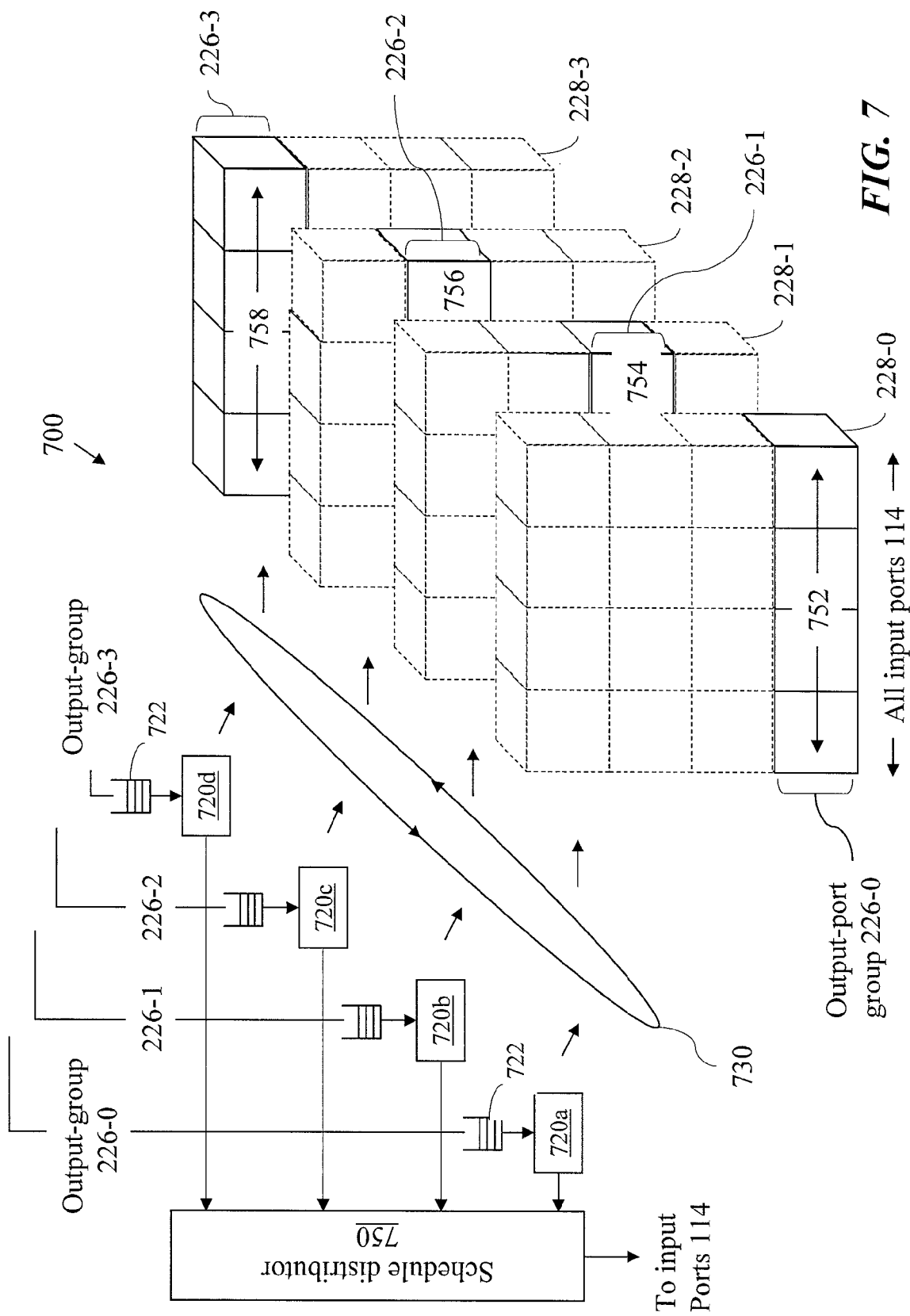
FIG. 7 illustrates another method of dividing the control space of FIG. 2 into non-intersecting control domains and assigning a scheduler to each control domain, with each control domain covering all input ports, an output-port group, and a sub-frame in a slotted time frame, in accordance with an embodiment of the present invention.

FIG. 7 is a schematic of a scheduler apparatus 700 using another alternative way to assign switch schedulers 720 (corresponding to schedulers 120 of FIG. 1) to non-intersecting control domains. In this embodiment each of the control domains is defined by all input ports 114, an output-port group 226, and a sub-frame 228, and one scheduler is employed per output group. A scheduler 720 associated with a particular output-port group 226 is cyclically associated with domains each defined by all input ports 114, the particular output-port group 226, and a different sub-frame 228.

Scheduler 720a receives scheduling requests generated at some or all input ports 114 and destined to output-port group 226-0, scheduler 720b receives scheduling requests from some or all input ports 114 and destined to output-port group 224-1, and so on. A buffer 722 may be associated with each scheduler 720 to hold scheduling requests in progress. Cyclic connector 730 allows each scheduler 720a, 720b, 720c, or 720d to operate within successive control domains during successive scheduling phases. Control domains 752, 754, 756, and 758 are respectively associated with schedulers 720a, 720b, 720c, and 720d during the first scheduling phase (phase 0) of a scheduling cycle.

The four successive control domains associated with scheduler 720a are defined by {all input ports 114, output-port group 206-0, sub-frame 228-0}, {all input ports 114, output-port group 206-0, sub-frame 228-1}, {all input ports 114, output-port group 206-0, sub-frame 228-2}, and {all input ports 114, output-port group 206-0, sub-frame 228-3}. The successive control domains associated with scheduler 720b are defined by {all input ports 114, output-port group 206-1, sub-frame 228-1}, {all input ports 114, output-port group 206-1, sub-frame 228-2}, {all input ports 114, output-port group 206-1, sub-frame 228-3}, and {all input ports 114, output-port group 206-1, sub-frame 228-0}. The successive control domains for schedulers 720c and 720d are likewise determined. Scheduling continues in a cyclic fashion until a scheduler is able to accommodate the request within a scheduling cycle or a determination is made that none of the schedulers is able to accommodate the request.

Figure 8:
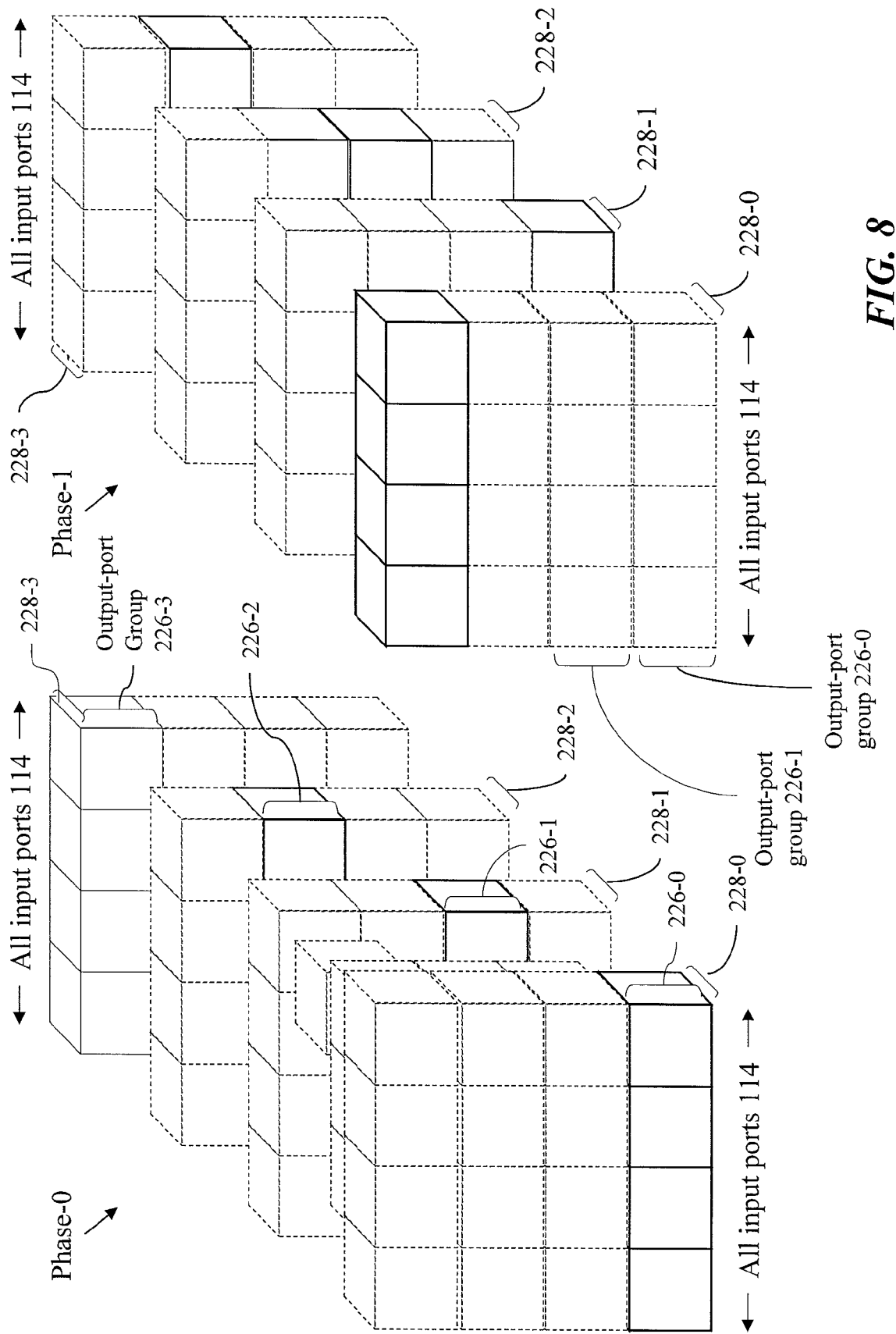
FIG. 8 illustrates the association of the schedulers with the control domains of FIG. 7 during successive sub-frames.

FIG. 8 illustrates the control domains, as defined above with reference to FIG. 7, associated with each of the four schedulers 720a-720d during two successive scheduling phases, phase-0 and phase-1. During scheduling phase 0, scheduler 720a operates within the control domain defined by all input ports 114, output-port group 226-0, and sub-frame 228-0. During scheduling phase 1, scheduler 720a operates within the control domain defined by all input ports 114, output port group 226-0, and sub-frame 228-1. During scheduling phase 0, scheduler 720b operates within the control domain defined by all input ports 114, output-port group 226-1, and sub-frame 228-1. During scheduling phase 1, scheduler 720b operates within the control domain defined by all input ports 114, output-group 226-1, and sub-frame 228-2. Likewise, during scheduling phase 0, schedulers 720c and 720d are respectively associated with the control domains {all input ports 114, output-port-group 226-2, sub-frame 228-2}, and {all input ports 114, output-port-group 226-3, sub-frame 228-3}, and during scheduling phase 1, schedulers 720c and 720d are respectively associated with the control domains {all input ports 114, output-port-group 226-2, sub-frame 228-3} and {all input ports 114, output-port-group 226-3, sub-frame 228-0}. The association of the schedulers with the control domains for the remaining scheduling phases is likewise determined.

It is important to note a major distinction between scheduling apparatus 300 and scheduling apparatus 500 (or 700). Each scheduler 320 in scheduling apparatus 300 has a fixed association with a control domain while each scheduler in scheduling apparatus 500 or 700 has a cyclic association with a different control domain during successive scheduling phases. In scheduling apparatus 300, each scheduling request is first offered to a front scheduler and may then propagate through subsequent schedulers according to a predetermined order. Thus, a scheduling request may be processed by more than one scheduler. In scheduling apparatus 500 (or 700), scheduling requests are divided among schedulers 520 (or 720) but each scheduling request is processed by a single processor which is cyclically associated with different control domains.

Mixing the Spatial Attributes

Scheduling apparatus 500 (FIG. 5) associates each scheduler with an input-port group. Likewise, scheduling apparatus 700 (FIG. 7) associates each scheduler with an output-port group. The fixed association of a scheduler with an input-port group or output-port group may simplify the apparatus to some extent but it does not permit load balancing among the schedulers. Load balancing is particularly desirable when the rate of scheduling requests varies significantly among the input ports 114.

Cyclical Scheduler-Control-Domain Pairing with Request Distributor

Figure 9:
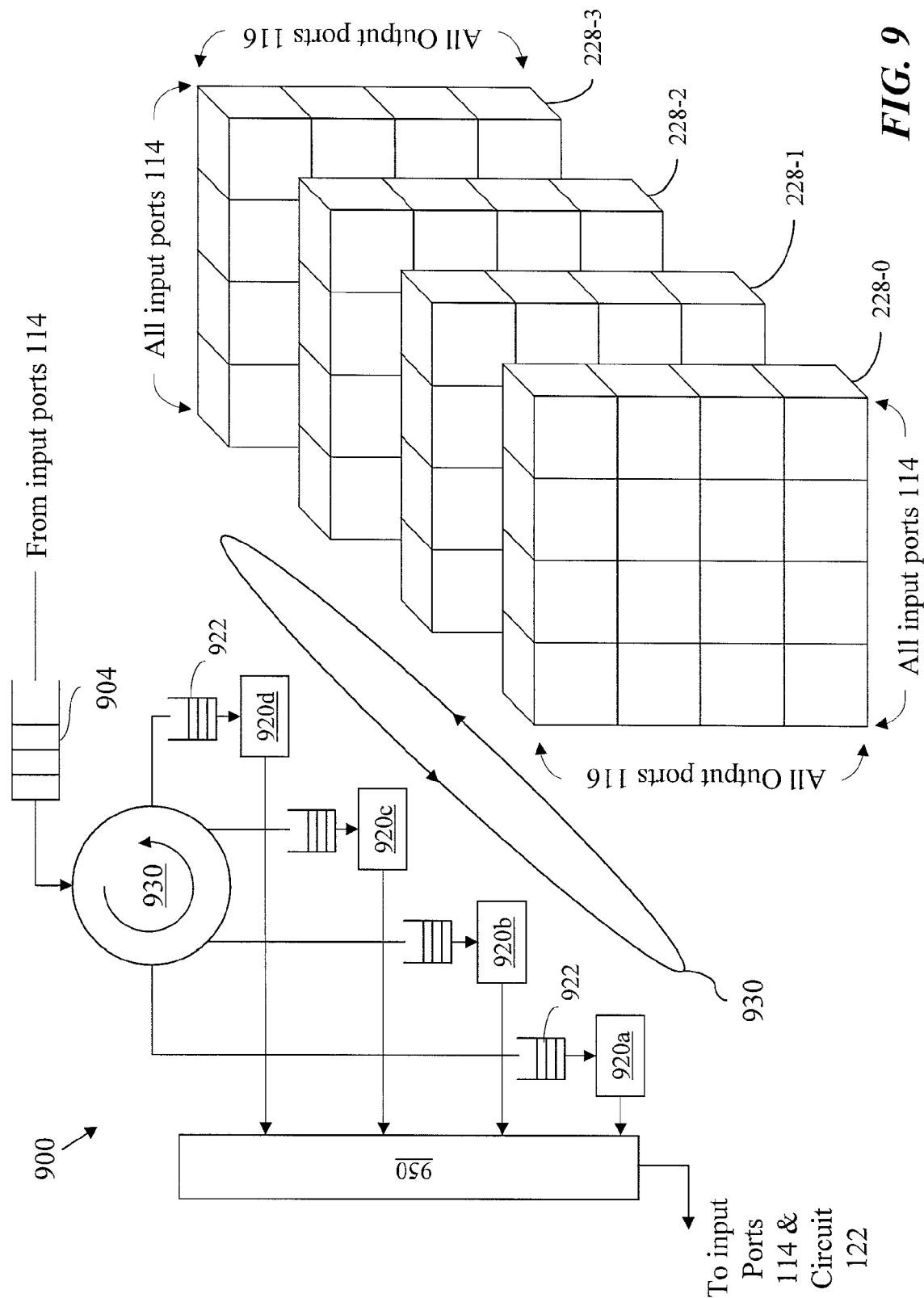
FIG. 9 is a schematic of a scheduling apparatus based on dividing the control space of FIG. 2 into non-intersecting control domains and cyclically assigning the switch schedulers to the non-intersecting control domains, with each control domain covering all input ports, all output ports, and a sub-frame in a repetitive time frame, in accordance with an embodiment of the present invention.

FIG. 9 is a schematic of a scheduling apparatus 900 based on dividing the control space 200 of FIG. 2 into non-intersecting control domains and cyclically assigning switch schedulers 920 (corresponding to schedulers 120 of FIG. 1) to the non-intersecting control domains, with each control domain covering all input ports 114, all output ports 116, and a sub-frame 228 in a slotted time frame 222. Scheduling requests received from the input ports 114 are held in a buffer 904 from which the requests are cyclically offered by request distributor 930 to the four schedulers 920a, 920b, 920c, and 920d regardless of the input port and output port specified in each of the scheduling requests. The request distributor 930 may distribute requests sequentially so that consecutive requests are offered to consecutive schedulers 920 (i.e., to a corresponding buffer 922). Alternatively, request distributor 930 may distribute the scheduling load to the schedulers 920 in a manner that equalizes the processing effort among schedulers 920a, 920b, 920c, and 920d. This is particularly useful when connection requests specify widely varying numbers of time slots per connection. A request distributor will be further described below with reference to FIGS. 15-18. A buffer 922 may be associated with each scheduler in order to hold a scheduling request until it is processed. The schedulers 920 are then cyclically associated with the four control domains defined by sub-frames 228-0 to 228-3. A scheduler 920 may attempt to find matching time slots in one or more of the control domains. Such a scheduling scheme has an advantage of equalizing the load of the four schedulers, thus increasing the throughput of the entire scheduling apparatus. For example, if scheduled connections from input-port group 224-0 have large durations, with a mean connection time of a minute or so, the rate of generating scheduling request from input-group 224-0 would be relatively low. A scheduler dedicated to input-group 224-0 would then be underutilized. Distributing all scheduling requests among the four schedulers 920 may reduce the scheduling effort per scheduler.

When the processing of a scheduling request allocated to a scheduler 920 is completed, the scheduler sends the processing result to a schedule distributor 950. The result includes, for the input port 114 and output port 116 specified in the scheduling request, either identifiers of allocated time slots or an indication that the scheduling request cannot be accommodated. Schedule distributor 950 communicates the result to connectivity circuit 122 and to the specified input port 114.

Figure 10:
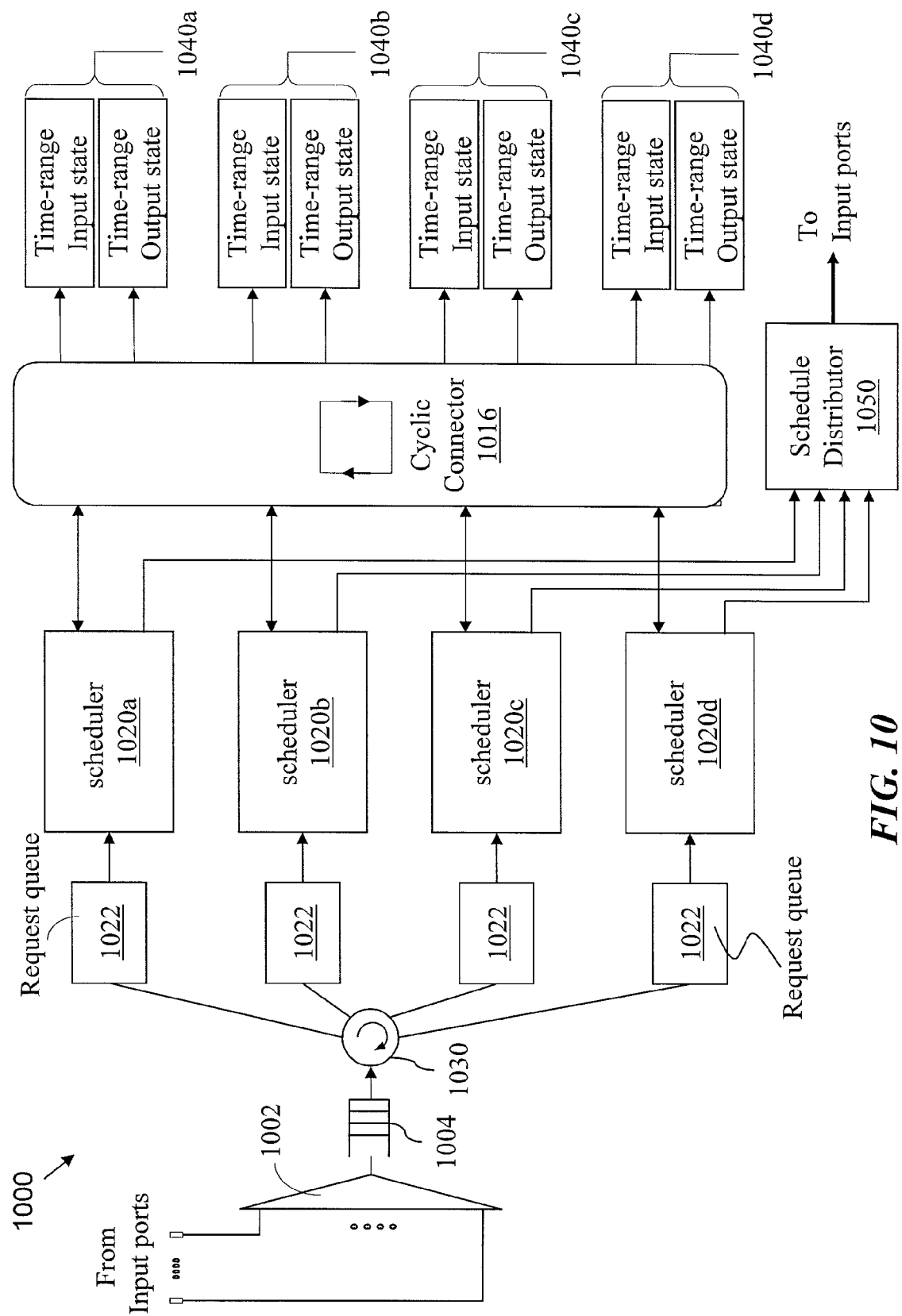
FIG. 10 is a block diagram of an apparatus detailing the schematic of FIG. 9, in accordance with an embodiment of the present invention.

FIG. 10 is a block diagram of a scheduling apparatus 1000 detailing the schematic scheduling apparatus of FIG. 9. High-speed scheduling apparatus 1000 comprises a plurality of schedulers 1020a, 1020b, 1020c, and 1020d (corresponding to schedulers 120 of FIG. 1) and a plurality of domain-state memory devices 1040a, 1040b, 1040c, and 1040d. Each domain-state memory device 1040 corresponds to a sub-frame 228 of the time frame 222 and holds the occupancy states of each input port 114 and each output port 116 during each time slot of a corresponding sub-frame 228. A cyclic connector 1016 cyclically connects the schedulers 1020 to domain-state memory devices 1040. Each domain-state memory device 1040 may comprise two separate memory devices, one memory device for holding the occupancy state of each input port 114 during each time slot in a respective sub-frame 228 and the other memory device for holding the occupancy state of each output port 116 during each time slot in the respective sub-frame 228.

In this embodiment, scheduling requests received from all the input ports 114 are directed to a buffer 1004, through a selector (multiplexer) 1002. The requests are then cyclically distributed among the schedulers 1020 by request distributor 1030. Request distributor 1030 may operate in different modes as described earlier with reference to request distributor 930 and as detailed below with reference to FIGS. 15-18. The schedulers 1020a-1020d are cyclically paired with the domain-state memory devices 1040a-1040d so that each scheduler 1020 potentially covers the entire time frame 222 during a scheduling cycle, and further so that the control domains of the schedulers become naturally non-coincident. A buffer 1022 is provided at each scheduler 1020 in order to hold scheduling requests in progress. A schedule distributor 1050 receives scheduling results from schedulers 1020a-1020d and distributes each result to a respective input port and to connectivity circuit 122 (FIG. 1). A result includes, for each scheduling request, an identifier for each time slot allocated within the time frame. Thus, access to the occupancy-state information for an input-port/output-port pairing is cyclic such that any two schedulers cannot simultaneously process a same input/output pairing. A connection request specifies a specific input port 114, a specific output port 116, and a number of time slots per time frame. To process a connection request, a scheduler 1020 attempts to find a sufficient number of coincident free time slots, also called matching time slots, in the specific input port 114 and the specific output port 116 by examining the occupancy state of the specified input port and the occupancy state of the specified output port stored in an accessed domain-state memory device 1040 over a corresponding sub-frame. If the number matching time slots is less than the requested number of time slots per frame, the search for further matching time slots resumes in a further sub-frame until the number of matching time slots equals the requested number of time slots per frame or the entire time frame has been examined. Thus, when a connection request specifies multiple time slots per frame, the time slots may be allocated in multiple sub-frames 228.

The throughput of scheduling apparatus 1000 is determined by the number of schedulers 1020, which preferably equals the number of sub-frames per time frame, i.e., the number of domain-state memory devices 1040.

Global Temporal Packing Versus Phased Temporal Packing

Figure 11A:
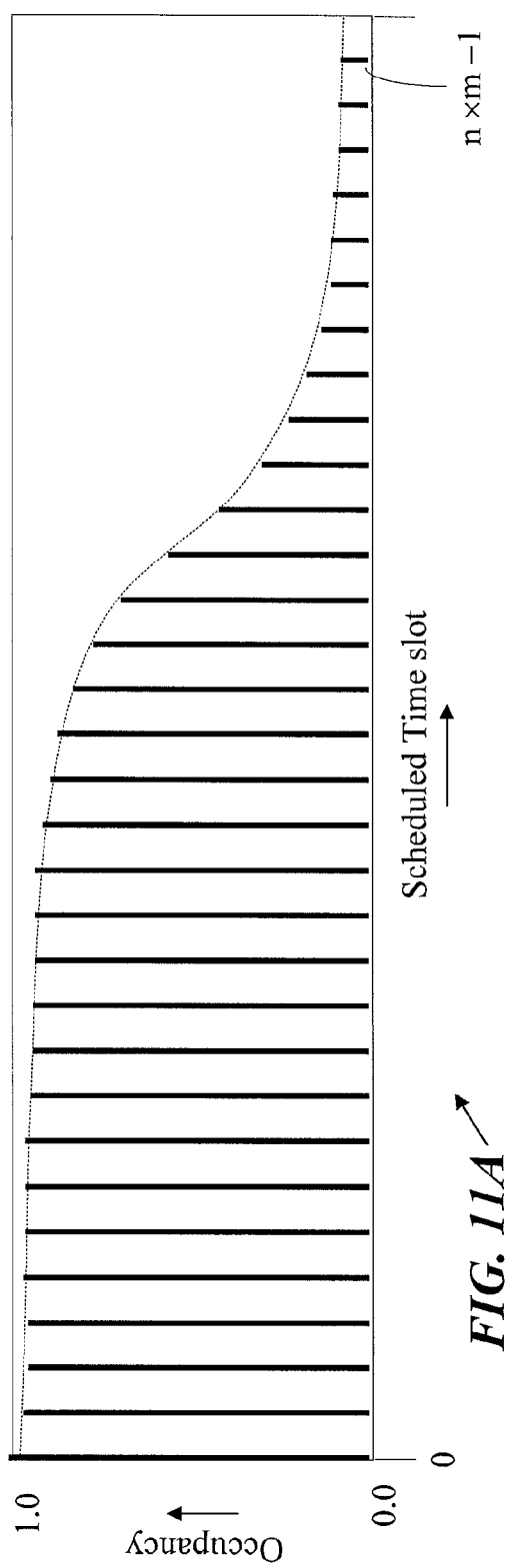
FIG. 11A illustrates an occupancy pattern of input ports or output ports of the switch of FIG. 1 during successive time-slots of a slotted time frame when global temporal packing is used.

FIG. 11A illustrates the mean occupancy of an input port 114 or an output port 116 in switch 100 when global temporal packing is used in scheduling each connection. With global temporal packing, the search for matching time slots at a specified input port and a specified output port always starts from a common time slot; for example the first time slot in the time frame. Global temporal packing may be realized with a single scheduler, for a switch 100 of small dimension, or an array of schedulers arranged in a single pipeline as illustrated in FIG. 3 and FIG. 4. In a single pipeline, the search for matching time slots always follows the same sequence of schedulers for each connection request.

Figure 11B:
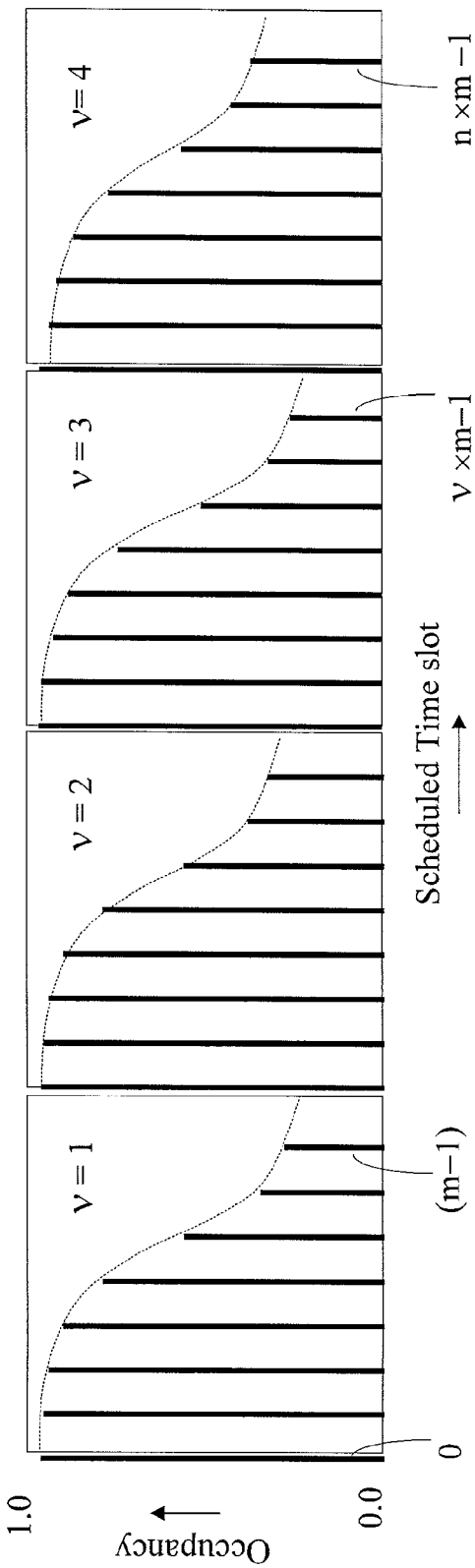
FIG. 11B illustrates an occupancy pattern of input ports or output ports of the switch of FIG. 1 during successive time-slots when phased temporal packing is used, in accordance with an embodiment of the present invention.

FIG. 11B illustrates the mean occupancy of an input port 114 or an output port 116 in switch 100 when phased temporal packing is used where the search for matching time slots for successive connection requests starts at spaced time slots of the time frame. Phased temporal packing may be realized with a single scheduler, for a switch 100 of small dimension, or an array of schedulers arranged in a circular pipeline as will be described below with reference to FIGS. 12-14. In a circular pipeline, connection requests are divided into streams of requests and the search for matching time slots for a given stream follows the same sequence of schedulers and may traverse each scheduler in the array of schedulers. The streams may be defined in several ways, for example according to a temporal order of request arrival.

Consider n pipeline partitions each including a number of schedulers with each scheduler associated with a control domain defined by all input ports, all output ports, and a sub-frame of the time frame. The number, m, of time slots covered by a pipeline partition equals the number of schedulers per partition multiplied by the number of time slots per sub-frame, and the number of time slots per time frame is set equal n×m. The time slots per time frame numbered as 0 to (n×m−1). The time slots covered by a pipeline partition v, $1 \leq v \leq n$, range from ((v−1)×m) to (v×m−1). With global temporal packing, however implemented, the expected occupancy of the n×m time slots, in the order in which they are encountered in the packing process, decreases monotonically as illustrated in FIG. 11A. The packing process starts with time-slot 0 in the example of FIG. 11A. The occupancy of early time slots in the scheduling time frame are naturally high, close to unity, while the occupancy of later time slots are likely to be low. The occupancy of a time slot is the proportion of time during which the time slot is allocated to a connection. A sharp cut-off, from high occupancy to near-zero occupancy may result if the traffic is spatially balanced, i.e., if each input port 114 distributes its traffic evenly among the output ports 116, and if the durations of the connections have a small variance. With phased packing, the expected occupancy within each pipeline partition also decreases monotonically as illustrated in FIG. 11B. The first time slot in each partition receives fresh scheduling requests in addition to scheduling requests that were not accommodated in a preceding pipeline partition.

The throughput of a pipeline partition is determined by the throughput of the most-loaded scheduler, likely the first, of the pipelined schedulers. In order to combine the benefits of the load-balanced multi-scheduler apparatus 1000 and the pipelined scheduling apparatus of FIG. 4, the sub-frames 228 of the time frame 222 may be arranged in sub-frame groups and a number of pipelined schedulers may be used within each of the sub-frame groups as will be described below with reference to FIG. 12.

Cyclical Partitioned Pipeline

Figure 12:
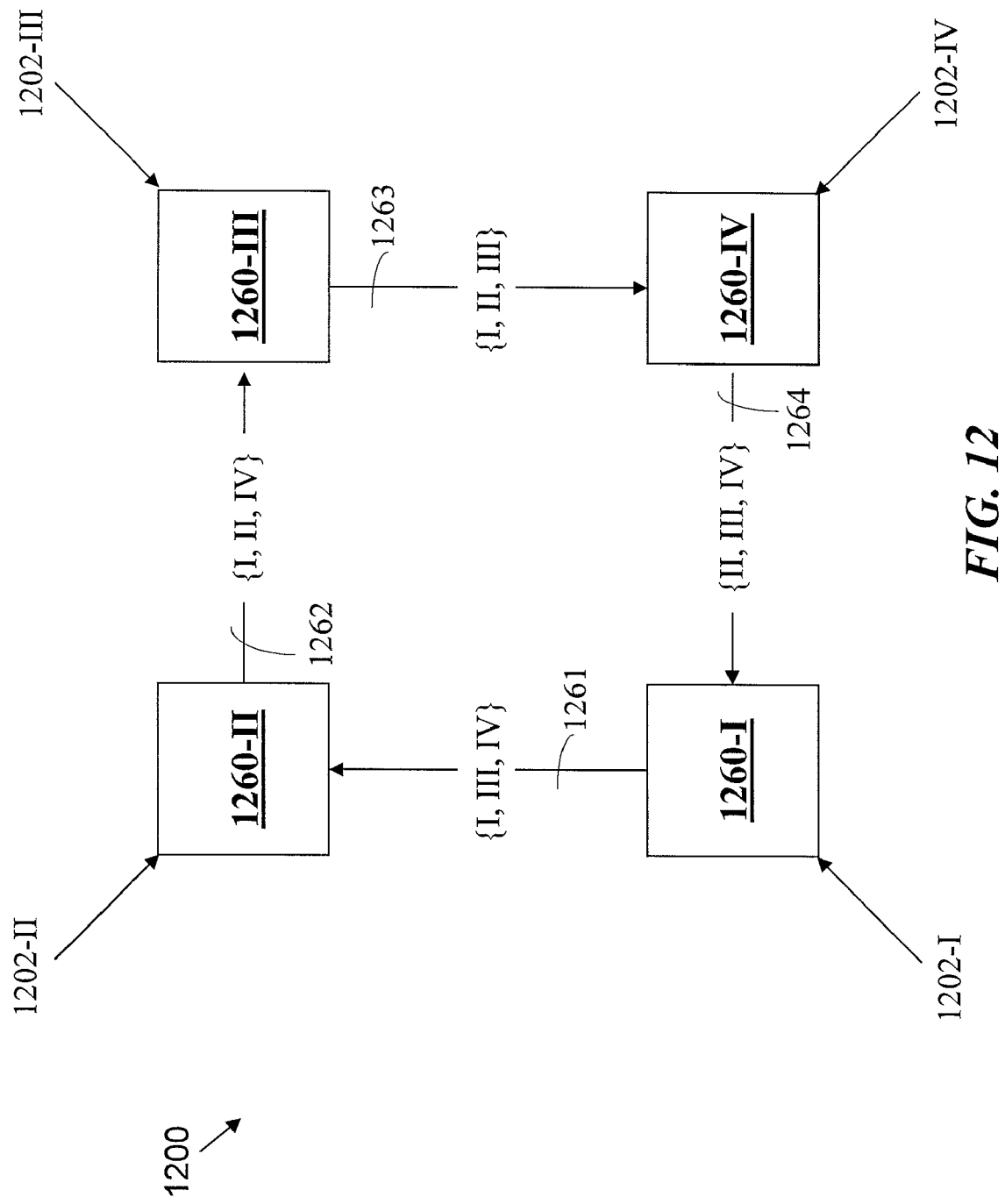
FIG. 12 is a schematic of a partitioned cyclical pipelined scheduling apparatus comprising four pipeline partitions, in accordance with an embodiment of the present invention.

FIG. 12 is a schematic of a scheduling apparatus 1200 configured as a circular pipeline of schedulers where the schedulers are arranged into scheduler groups 1260. The illustrated scheduling apparatus 1200 includes four scheduler groups 1260-I, 1260-II, 1260-III, and 1260-IV. Links 1261, 1262, 1263, and 1264 interconnect the scheduler groups, forming a ring of scheduler groups. Link 1261 may carry scheduling requests belonging to streams 1202-I, 1202-III, and 1202-IV as indicated by the notation {I, III, IV}. Likewise, each of links 1262, 1263, and 1264 may carry requests that belong to three streams. The individual schedulers within each scheduler group 1260 are not illustrated in FIG. 12. Each scheduler group 1260 may comprise multiple schedulers arranged in a pipeline similar to that described with reference to FIG. 4. Each scheduler within a scheduler group 1260 is associated with a sub-frame 228 in time frame 222 (FIG. 2). Thus, each scheduler-group 1260 covers a number of sub-frames 228. Four streams of scheduling requests 1202-I, 1202-II, 1202-III, and 1202-IV are illustrated. Each of the four streams may originate from a subset of input ports 114. Alternatively, each stream may include connection requests destined for a subset of output ports. The streams 1202 may also be formed by allocating scheduling requests received from the input ports 114 of switch 100 to scheduler groups 1260 in a manner that equalizes the scheduling loads of the scheduler groups regardless of the spatial attributes of each scheduling request. It is noted that in a pipeline group 1260, each scheduler is dedicated to a specific sub-frame 228 of time frame 222 and, hence, the control domains of all schedulers are non-intersecting.

Figure 13:
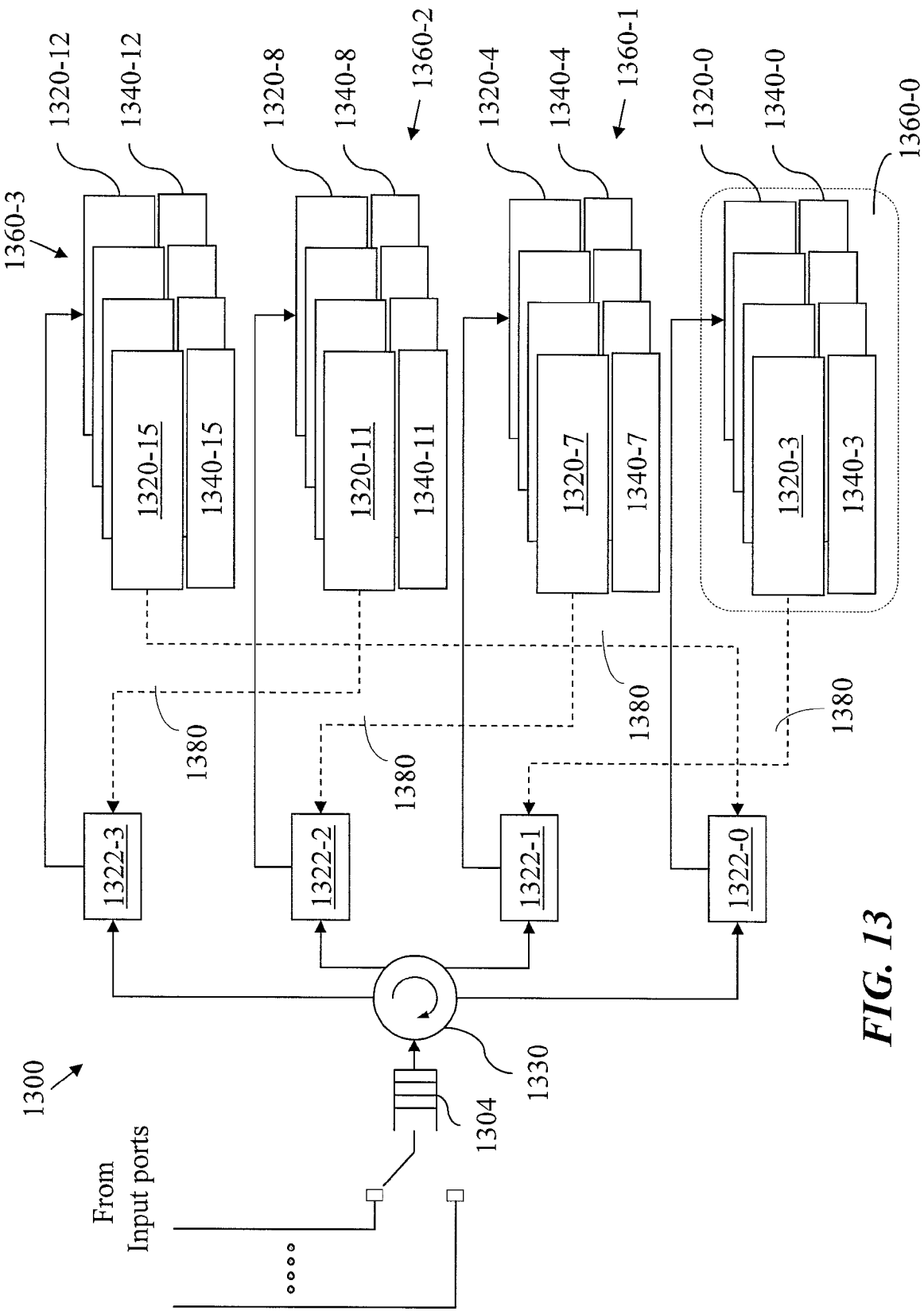
FIG. 13 is a block diagram of an apparatus using a partitioned pipelined scheduler with cyclical assignment of the scheduling requests among the four pipeline partitions, in accordance with an embodiment of the present invention.

FIG. 13 is a block diagram further detailing the scheduling apparatus 1300 schematically presented in FIG. 12. As illustrated in FIG. 13, scheduling requests received by controller 125 (FIG. 1) from input ports 114 are cyclically distributed by request distributor 1330 to request queues 1322. Each request queue 1322 feeds a scheduler group 1360. Each scheduler group 1360 is configured as a pipeline of scheduler planes, where each scheduler plane includes a scheduler 1320 (corresponding to a scheduler 120 of FIG. 1) and an associated domain-state memory device 1340. Each scheduler plane is uniquely associated with a sub-frame 228. Thus, each scheduler group 1360 is associated with a number of sub-frames equal to the number of scheduler planes within the scheduler group. The output of each scheduler 1320 includes either an indication of allocated time slots or parameters of a scheduling request to be cascaded to a subsequent scheduler 1320. The subsequent scheduler 1320 may be within the same scheduler group 1360 or in another scheduler group. Successive schedulers 1320 within each scheduler group 1360 are connected by internal channels (not illustrated in FIG. 13). A channel 1370 supplies the first scheduler 1320 of each scheduler group 1360 with scheduling requests held in a corresponding buffer 1322. An inter-group channel 1380 is used to connect a last scheduler 1320 in each scheduler group 1360 to a request queue 1322 associated with a subsequent scheduler group 1360. A last scheduler in a scheduler group 1360 is the tail scheduler of the pipelined schedulers within the scheduler group. The search for matching time slots for a connection may traverse each scheduler in any scheduler group only once during a scheduling cycle.

In the illustrated apparatus 1300, each scheduler group 1360 has four pipelined schedulers 1320 each permanently associated with a domain-state memory device 1340. The first scheduler group 1360-0 includes schedulers 1320-0 to 1320-3 and the last scheduler group 1360-3 includes schedulers 1320-12 to 1320-15. The end scheduler 1320-3 in scheduler group 1360-0 has a channel 1380 to request buffer 1322-1 which feeds the front scheduler 1320-4 of scheduler group 1360-1 through a channel 1370. Likewise, end scheduler 1320-7 of scheduler group 1360-1 has a channel to request buffer 1322-2, end scheduler 1320-11 of scheduler group 1360-2 has a channel to request buffer 1322-3, and end scheduler 1320-15 has a channel to request buffer 1322-0.

A time frame 222 having 4096 time slots may be divided into 64 sub-frames 228 each sub-frame including 64 time slots. A single pipeline 400 as illustrated in FIG. 4 would have 64 schedulers 420 with all fresh scheduling requests being first offered to the front scheduler. Alternatively, in accordance with the present invention, the 64 schedulers may be arranged into scheduler groups as illustrated in FIG. 13. Using 16 scheduler groups 1360 each having four pipelined schedulers 1320, enable a division of fresh scheduling requests into 16 streams each offered to a front scheduler 1320 of a scheduler group 1360, with each of the 16 scheduler groups covering 256 time slots. The front scheduler of a scheduler group may also receive scheduling requests from a preceding scheduler group through an inter-group channel 1380 as described above.

Figure 14:
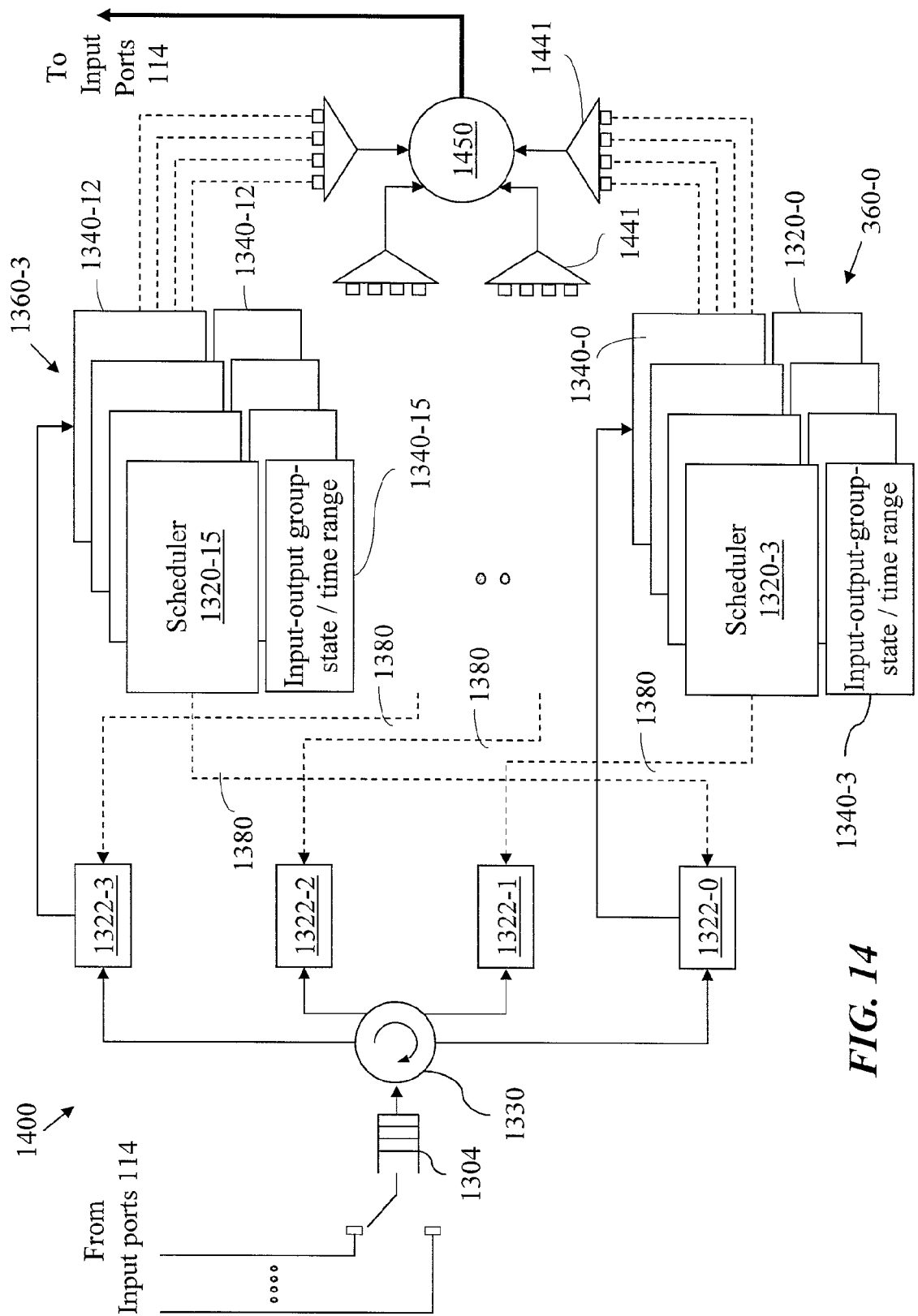
FIG. 14 further details the block-diagram of FIG. 13.

FIG. 14 illustrates the same scheduling apparatus 1300 showing only two scheduler groups 1360 and illustrating the interface between the pipelined schedulers 1320 of each scheduler group 1360 and a result distributor 1450. Each scheduler 1320 within any scheduler group 1360 may either complete the required time-slot allocation for a scheduling request, or pass parameters of the scheduling request to a subsequent scheduler in the scheduler group 1360. A multiplexer 1441 receives results from individual schedulers 1320 of a corresponding scheduler group 1360. Because of the possibility of simultaneous results from two or more schedulers 1320 of the same scheduler group 1360, multiplexer 1441 may have a buffer at each input. Such a buffer is likely to be a short buffer holding a small number of results. A result includes an identifier of each time slot reserved. The output of each multiplexer 1441 connects to a result distributor 1450 which cyclically transfer results from multiplexers 1441 to input ports 114 and to connectivity circuit 122. Other arrangements for delivering results from scheduler groups 1360 to input ports 114 and connectivity circuit 122 may be devised. The input ports 114 use the results to transmit data segments during time-slots indicated in the results while the connectivity circuit 122 uses the results to cause the switch fabric 110 to provide a path from a specified input port 114 to a specified output port 116 during the indicated time slots.

Request Distributor

Figure 15:
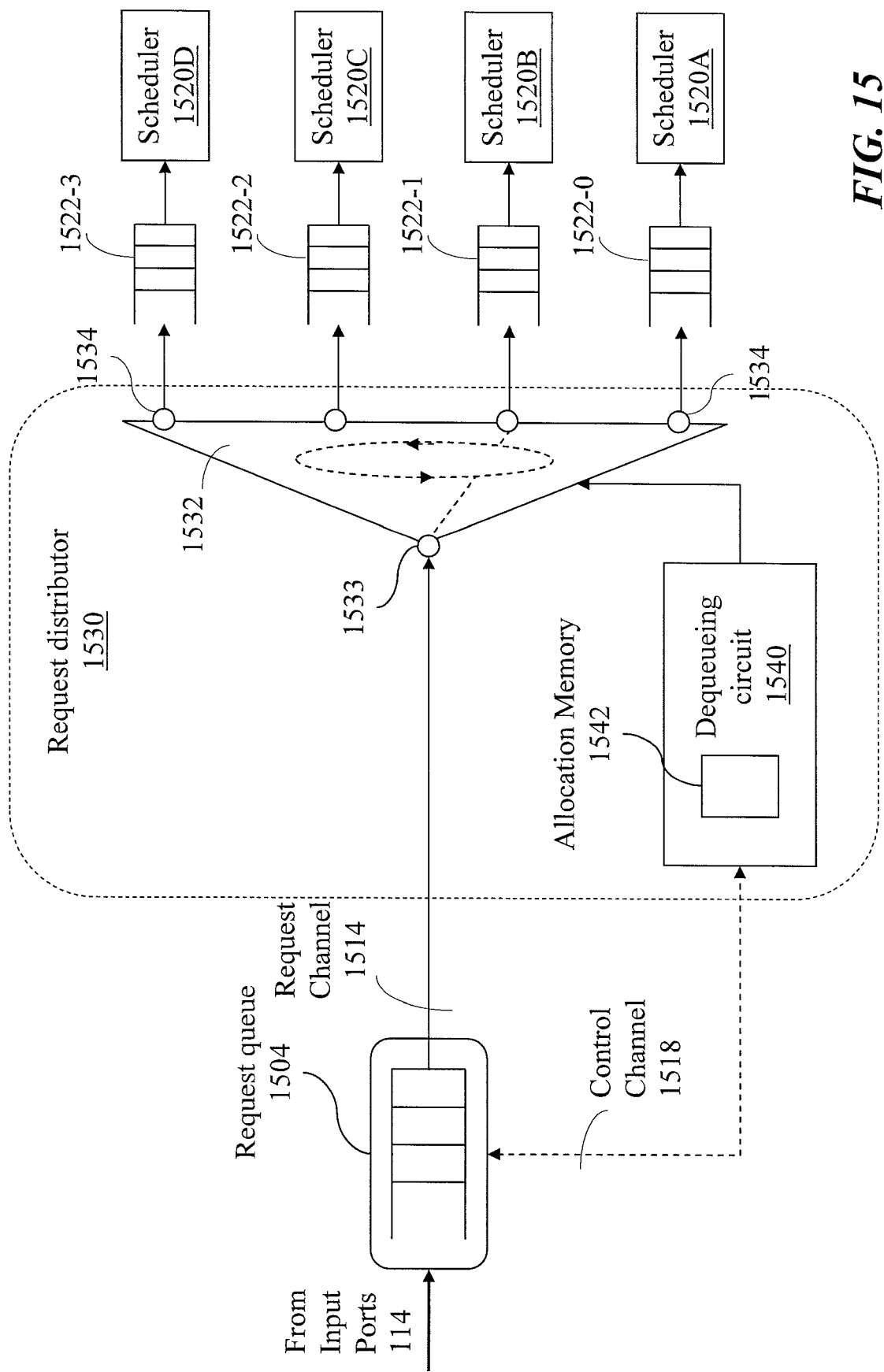
FIG. 15 illustrates a request distributor, in accordance with an embodiment of the present invention.

FIG. 15 illustrates a request distributor 1530 for use in the scheduling apparatus of FIGS. 9, 10, and 13. Any of request distributors 930 (FIG. 9), 1030 (FIG. 10), or 1330 (FIG. 13) may have the configuration of request distributor 1530 A request buffer 1504 (corresponding to request buffer 904, 1004, or 1304 of FIGS. 9, 10, and 13 respectively) may be used to hold scheduling requests received from input ports 114.

Request distributor 1530 comprises a selector 1532, which receives scheduling requests held in request buffer 1504, and a dequeueing circuit 1540 which controls both request buffer 1504 and selector 1532. The illustrated selector 1532 has a single inlet 1533 and four outlets 1534 each outlet connecting to a buffer 1522 associated with a scheduler 1520; four buffers 1522-0, 1522-1, 1522-2, and 1522-3 associated with schedulers 1520A, 1520B, 1520C, and 1520D, respectively, are illustrated. Although only four schedulers are illustrated, it is understood that any realistic number of schedulers (up to 256 for example) may be accommodated. The dequeueing circuit 1540 includes an allocation memory 1542 which is used in selecting a scheduler 1520. The method of operation of request distributor 1530 may be tailored to suit the type of scheduling requests as described below.

Unconditional Cyclic Distribution

A method of unconditional cyclic distribution of scheduling requests may be used when scheduling requests are homogeneous, with each scheduling request requiring, more or less, the same processing effort. If, for example, each scheduling request specifies the same number of time slots per time frame, request distributor 1530 may simply distribute successive scheduling requests in a cyclic manner to outlets 1534 where they are queued in buffers 1522 associated with schedulers 1520. In a simple cyclical distribution, allocation memory 1542 stores an identifier of a last-allocated outlet 1534 and when there is at least one request waiting in request buffer 1504, dequeueing circuit 1540 selects a new outlet 1534 immediately succeeding the last-allocated outlet 1534 stored in allocation memory 1542, updates the entry in allocation memory 1542 to indicate the new outlet, sets selector 1532 to connect inlet 1533 to the new outlet 1534, and dequeues a request from request memory 1504 to be sent through request channel 1514 and selector 1532 to the scheduler 1520 associated with the new outlet. With K>1 outlets 1534 numbered 0 to (K−1), the identifying number of the new (immediately succeeding) outlet 1534 is the identifying number of the last-used outlet plus one (modulo K).

Conditional Distribution

Figure 17:
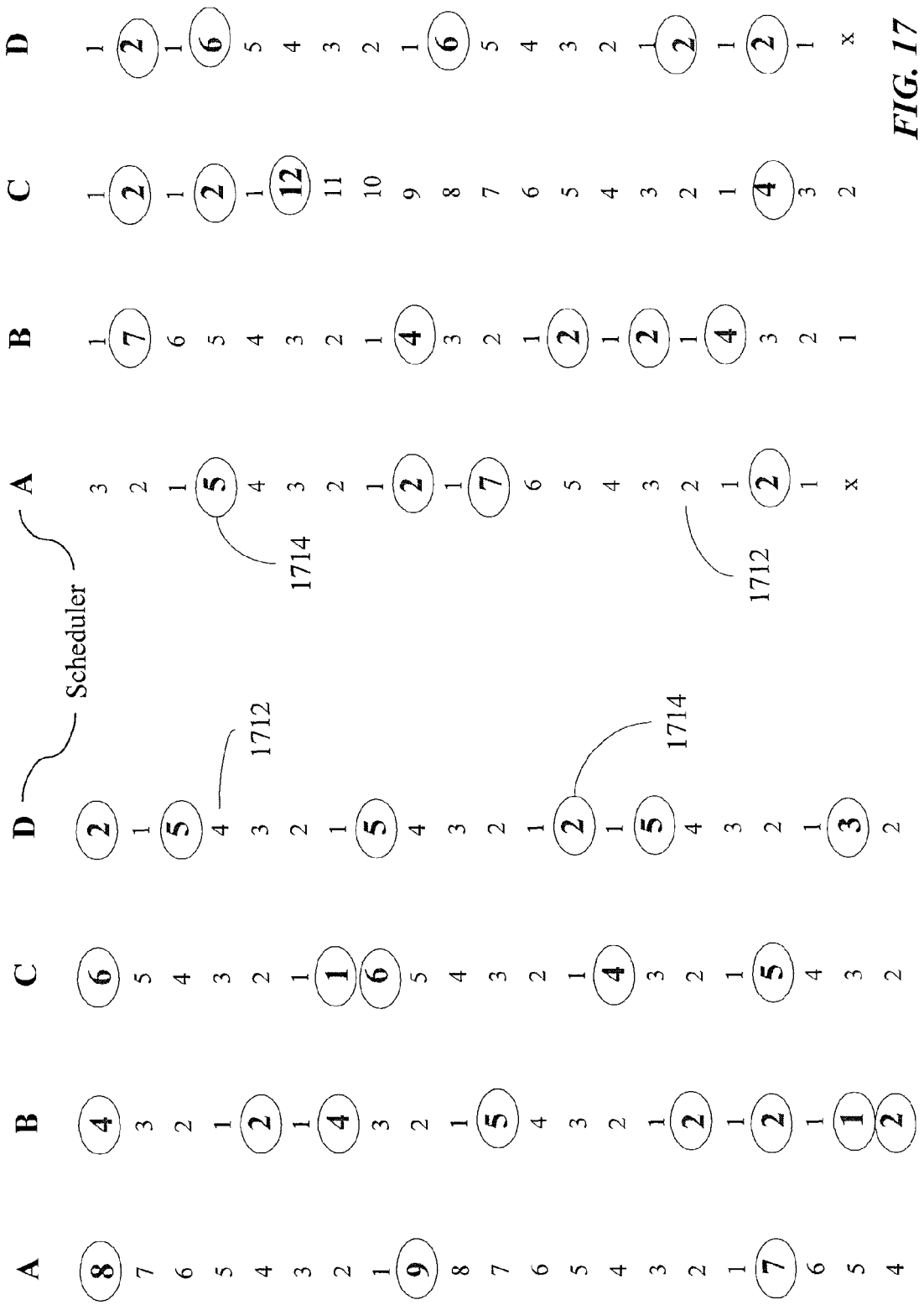
FIG. 17 illustrates a first example of scheduler-load balancing according to the method of FIG. 16 using a first design parameter.
Figure 18:
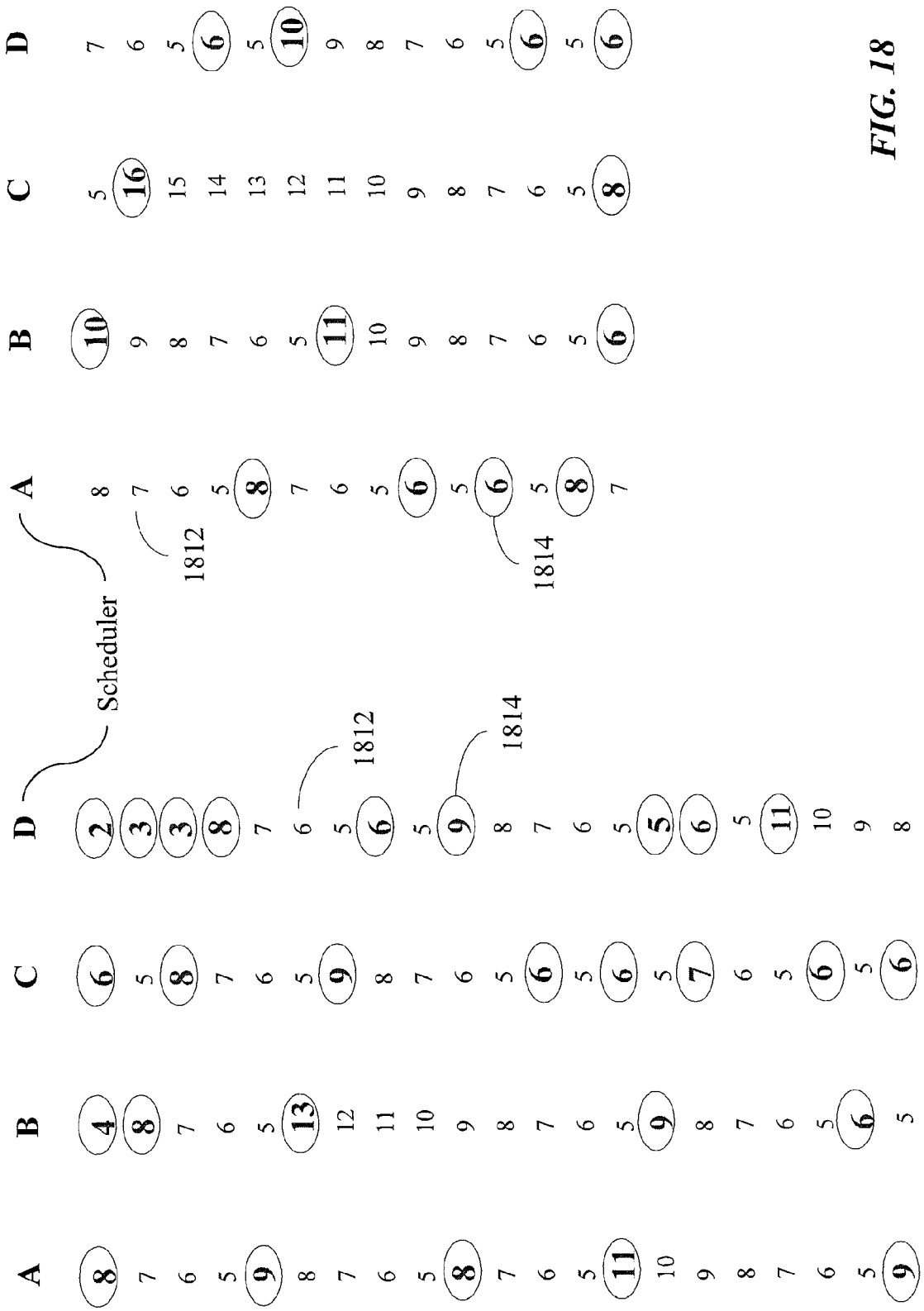
FIG. 18 illustrates a second example of scheduler-load balancing according to the method of FIG. 16 using a second design parameter.

Conditional distribution applies to a more general case where scheduling requests are heterogeneous, requiring varying processing efforts. For example, individual scheduling requests may specify widely varying numbers of time slots per time frame. A table relating the scheduling effort (in arbitrary units) to the number of time slots per time frame per request may be devised and stored in allocation memory 1542. Under certain assumptions of randomness conditions, the use of unconditional cyclic distribution with heterogeneous scheduling requests may result in equalization of the scheduling loads of the schedulers 1520, when viewed over a long period of time. However, such randomness conditions cannot be assured and even if such assumptions are plausible, there is likely to be significant fluctuations of schedulers' loads observed over short intervals of time; in the order of a millisecond each for example. To circumvent this problem, a simple fast algorithm according to the present invention, described with reference to FIGS. 16-18, is devised to ensure short-term and long-term equalization of schedulers' loads regardless of the variation of the scheduling requirements.

Figure 16:
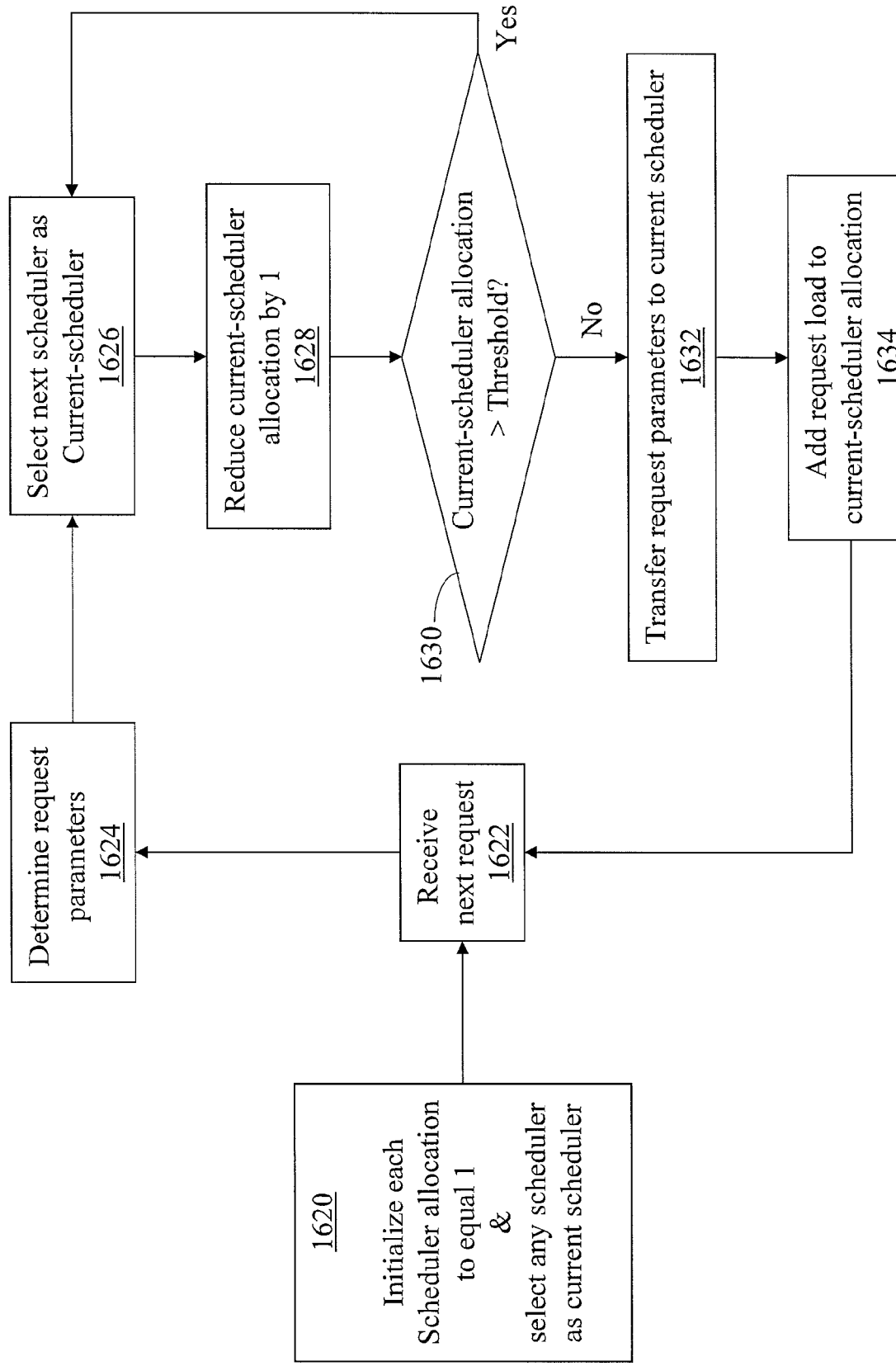
FIG. 16 is a flow chart detailing a scheduler-load balancing method implemented by the request scheduler of FIG. 15, in accordance with an embodiment of the present invention.

FIG. 16 is a flow-chart illustrating the scheduler-load-balancing method of the present invention. In step 1620, a "scheduler-allocation" is initialized to equal 1 for each of μ schedulers numbered 0 to (μ−1) (μ=4 in the example of FIG. 15). Any of the schedulers may be selected as a "current-scheduler". In step 1622, buffer 1504 is examined to determine if there is at least one waiting scheduling request. If there is at least one waiting scheduling request, a scheduling request is selected to be sent to one of the schedulers 1520. Any policy, such as a first-in-first-out (FIFO) policy, may be used to select a scheduling request from among two or more waiting scheduling requests, if any. In step 1624, dequeueing circuit 1540 determines, from each scheduling request, corresponding request parameters such as an identifier of an input port 114, an identifier of an output port 116, and a number of time-slots per time frame. In step 1626, a "current scheduler" is selected to be the next scheduler, where the schedulers are identified in a serial order. The current scheduler is determined by adding unity to an identifier of a scheduler previously treated as a "current scheduler". The schedulers are considered, but not necessarily selected, in a cyclic fashion and, hence, the scheduler following scheduler (μ−1) is scheduler 0. In step 1628, a scheduler-allocation variable associated with the current scheduler is reduced by unity. In step 1630, the new value of the scheduler-allocation is compared with a predefined "allocation threshold". The allocation threshold is a number that indicates the minimum scheduler load above which a scheduler is not assigned a further scheduling request. The allocation threshold may be zero as in the example of FIG. 17 to be described below, indicating that a scheduler has to be totally free to be assigned a new scheduling request. The threshold may also be a positive number as in the example of FIG. 18 to be described below, indicating that a scheduler may be assigned a new scheduling request when its allocated scheduling load does not exceed the value of the threshold. The use of a positive threshold has an advantage of ensuring that a scheduler 1520 would not be idle while selector 1532 is directing scheduling requests to other schedulers 1520.

If step 1630 determines that the allocation of the current scheduler is equal to or less than the threshold, step 1632 is executed.

If step 1630 determines that the allocation of the current scheduler exceeds the predefined threshold, a subsequent scheduler is selected in step 1626 and steps 1628 and 1630 are repeated until the allocation of the current scheduler reaches the predefined threshold and step 1632 is then executed.

In step 1632, a scheduling request selected in step 1622 is transferred through selector 1532 to a buffer 1522 associated with the current scheduler. In step 1634, the scheduling load, which is one of the parameters determined in step 1624, is added to the allocation for the current scheduler and step 1622 is executed again when there is at least one waiting scheduling request in buffer 1504 as described above.

FIG. 17 illustrates the sequence of allocating scheduling requests to the four schedulers 1520A, 1520B, 1520C, and 1520D where a scheduler is allocable only if its current allocation reaches a value of zero after a reduction of 1 in step 1628. The four schedulers 1520A-1520D are indicated in FIG. 17 as 'A', 'B', 'C', and 'D', respectively. Each entry 1712 or 1714 indicates an allocation to a corresponding scheduler. A sequence of forty scheduling requests arriving at arbitrary instants of time is used in this example. The processing effort of a request is considered in this example to be proportional to the number of time slots per time frame specified in the request. The specified numbers of time slots per frame for the 40 requests were selected to be {8, 4, 6, 2, 5, 2, 4, 1, 6, 5, 9, 5, 2, 4, 5, 2, 7, 2, 5, 1, 3, 2, 7, 2, 2, 5, 2, 6, 12, 2, 4, 6, 7, 2, 2, 2, 4, 2, 4, 2}. The mean and variance of the number of time slots per connection in this sample are 4.075 and 5.819, respectively.

The allocation for each of the schedulers is set equal to 1 in step 1620, and scheduler D is selected as a current scheduler. When the first request is read from request buffer 1504 in step 1622, the request parameters are determined (parsed) in step 1624 and the request load was determined to equal 8. In step 1626, the identifier of the current selector is increased by 1, thus selecting the current selector as 1520A (which follows scheduler 1520D). In step 1628, the allocation of scheduler 1520A is reduced by 1 (from its initialized value of 1). In step 1630, it is determined that the current-scheduler allocation, i.e., the allocation for scheduler 1520A, which now equals zero, is not greater than the predefined threshold of zero. Thus, step 1632 is executed and selector 1532 is set by dequeueing circuit 1540 to connect the request channel 1514 to outlet 1534-0 which leads to the input buffer 1522-0 of scheduler 1520A. Dequeueing circuit 1540 also prompts transmission of the parameters of the scheduling request from request buffer 1504. In step 1634, the request load is added to the allocation of scheduler 1520A, which then has a value of 8. Dequeueing circuit 1540 now returns to its initial state to read a new scheduling request (step 1622) which may already be queued in request buffer 1504. If request buffer 1504 is empty, no further action is taken until a new scheduling request is placed in buffer 1504.

When the second, third, and fourth scheduling requests were received, selector 1532 connected request channel 1514 to outlets 1534-1, 1534-2, and 1534-3, respectively and the allocations for schedulers 1520-B, 1520C, and 1520D now become 4, 6, and 2, respectively. The last scheduler considered is now 1520D. When the fifth request arrives, step 1624 determines that the load indicated in the request is 5 time slots per time frame. Step 1626 determines that the next scheduler is 1520A, which has a current allocation of 8. Step 1628 reduces the current allocation to 7 and step 1630 determines that this allocation exceeds the threshold of zero. Step 1626 is then revisited to select the next scheduler 1520B. Step 1628 reduces the allocation of scheduler 1520B from 4 to 3, and step 1630 determines that this value is still greater than the threshold of zero. The process continues where the schedulers are considered in the sequence 1520C, 1520D, 1520A, 1520B, and 1520C and the schedulers' allocations are reduced in step 1628 as indicated in FIG. 17. When Scheduler 1520D is now visited, step 1628 reduces its allocation from 1 to zero, and step 1630 determines that scheduler 1520D is eligible for a new request allocation. Step 1632 is then executed to connect request channel 1514 to outlet 1534-3 and transfer the parameters of the fifth request to the input buffer 1522-3 associated with scheduler 1520D. The allocation for scheduler 1520D is then increased in step 1534 to 5 (which is the requested load of the fifth request). The process continues in this fashion resulting in the pattern of FIG. 17 in which a circled number 1714 indicates the scheduler selected and its updated scheduling load. As illustrated, the forty requests are respectively allocated to schedulers 1520a-1520d in the order:

"ABCD DBBC CDAB DCDB ABCB DBBC DACD CABD ABBD BACD", where only the suffixes identifying the schedulers 1520A-1520D are indicated for brevity.

Thus, while the schedulers are considered in a cyclical order, they are not necessarily allocated in a cyclical order. In FIG. 17, each entry 1712 corresponds to a scheduler 1520 that is not yet considered eligible to be allocated a new scheduling request while each circled entry 1714 corresponds to a scheduler that has just been allocated a new scheduling request.

FIG. 18 illustrates the process of allocating the same sequence of 40 scheduling requests, used in the example of FIG. 17, to schedulers 1520A-1520D, using the method of FIG. 16 with the allocation threshold set to equal four instead of zero. Notably, a current-scheduler determined in step 1626 is allocated when its current allocation does not exceed 5, while in FIG. 17 a current-scheduler determined in step 1626 is allocated when its current allocation does not exceed 1. Each entry 1812 in FIG. 18 corresponds to a scheduler 1520 that is not yet considered eligible to be allocated a new scheduling request while each circled entry 1814 corresponds to a scheduler that has just been allocated a new scheduling request.

From FIGS. 17 and 18, it is determined that, for the given sample of 40 scheduling requests, the total request loads allocated for the four schedulers 1520A, 1520B, 1520C, and 1520D are 40, 41, 42, and 40, respectively, when the scheduler-allocation threshold is zero, and 41, 40, 42, and 40, respectively, when the scheduler-allocation threshold is four.

Spreading Allocated Time Slots of a Multiple-Time-Slot Connection

Figure 19:
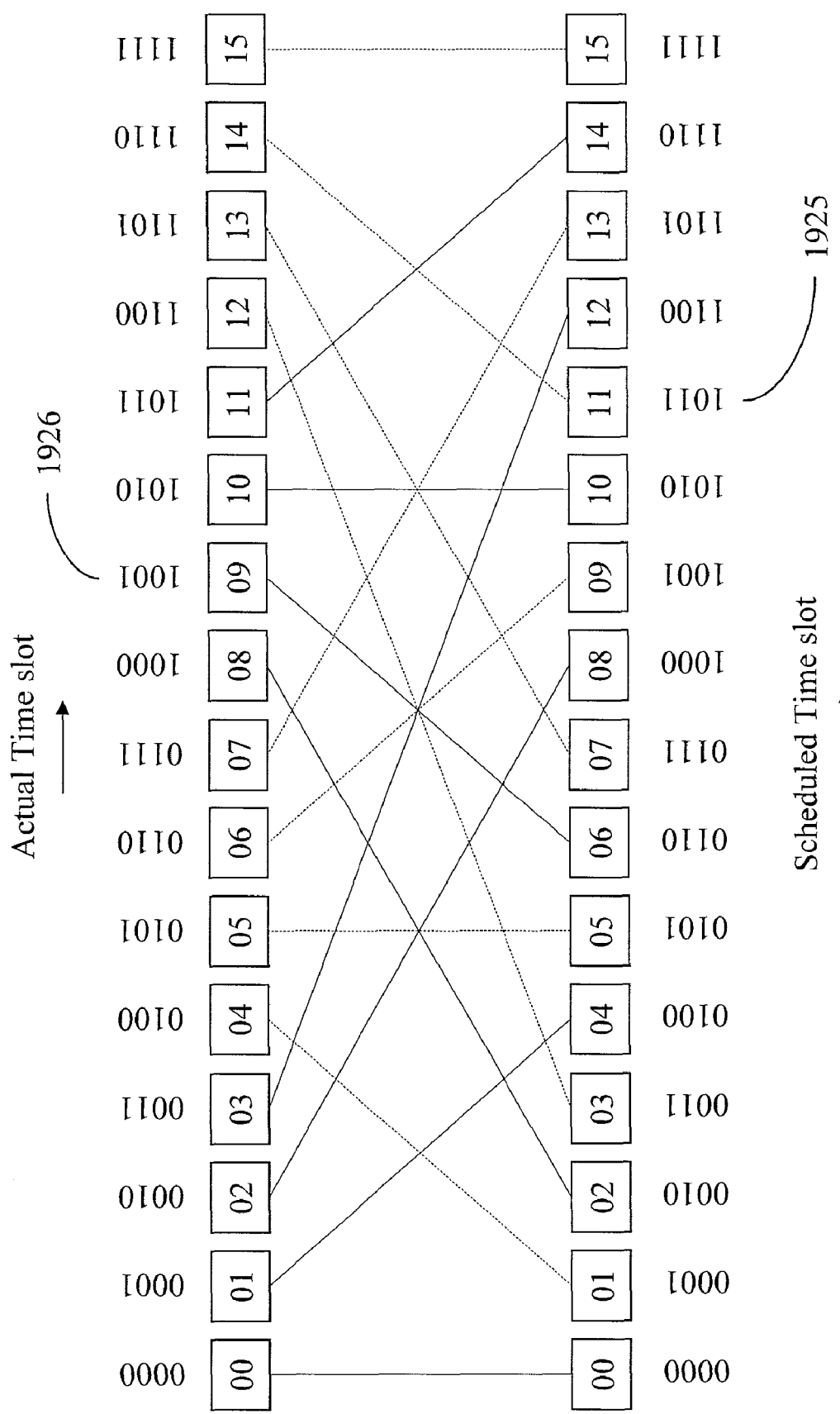
FIG. 19 illustrates a method of pacing scheduled time slots, in accordance with an embodiment of the present invention.

A scheduling process, particularly one using temporal packing, may result in clustering of matching time slots. Clustering may be inconsequential in some connection types but may be undesirable in connections that are sensitive to delay jitter. Clustering, however, may be avoided by using time-slot mapping where the time slots used in the scheduling process are not necessarily real time slots as observed at an input port 114 or output port 116. FIG. 19 illustrates a simple mapping of scheduling time slots to real time slots in a time frame having 16 time slots. Such mapping can easily be incorporated in controller 125 (FIG. 1). In FIG. 19, the time slots of scheduling time frame are indicated in the bottom array 1925 as sequential numbers ranging from 0 to 15 (binary numbers 0000 to 1111) and the corresponding actual time slots are indicated in the top array 1926. In a switch 100 offering fine granularity, the number of time slots per frame may be high, of the order of 8192 or so. After a schedule is determined by a scheduling apparatus 300, 500, 700, 1000, or 1300, controller 125 (FIG. 1), which includes the scheduling apparatus, may implement a one-to-one mapping of scheduled time slots to real time slots in a manner which spaces the scheduled time slots of each connection requiring multiple time slots per time frame.

The invention therefore provides methods and apparatus for scheduling connection requests in a high-capacity switch. A scheduling apparatus of a switch of a capacity of 10 Terabits per second, for example, may need to process connections at rates exceeding several million connections per second. Prior-art scheduling techniques may not provide a processing throughput of this magnitude. The switch fabric 110 used to illustrate the embodiment of the present invention may be a conventional memoryless space switch or the rotator-based space switch, described in the aforementioned U.S. Pat. No. 5,168,492, which comprises a bank of transit memories interposed between two rotators. The switch fabric 110 may also comprise a plurality of memoryless space-switch modules, such as photonic switch modules, arranged in an unfolded multi-stage structure or in a mesh structure as described in the aforementioned U.S. patent application Ser. No. 10/223,222. In a multi-stage or mesh structure having no internal buffers, a path traversing the switch fabric occupies the same time interval in each switch module and scheduling apparatus 300, 500, 700, 1000 and 1300 which comprise schedulers operating on different sub-frames may be used to realize a high scheduling throughput. However, in a multi-stage or mesh structure, there may be numerous paths from each input port 114 to each output port 116 during any time slot in a time frame 222. A scheduler 320, 520, 720, 1020, or 1320 would then be adapted to select a path from among available paths during the same time slot. In a single-stage switch fabric 110, there is only one path from an input port 114 to an output port 116 during a given time slot.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

I claim:

1. A multi-processor scheduling apparatus for facilitating establishment of a connection in a switch fabric having a plurality of input ports and a plurality of output ports in response to receiving connection requests, said plurality of input ports being divided into non-intersecting input-port groups, said apparatus comprising multiple schedulers individually associated with non-intersecting control domains, each of said control domains being bounded by at least one of:
    a sub-frame of a repetitive time frame divided into non-intersecting sub-frames;
    an input-port group within said plurality of input ports; and
    an output-port group within said plurality of output ports;
each scheduler employing at least one processor and accommodates a connection request within a control domain with which said each scheduler is associated;
wherein each control domain is defined by an input-port group from among said non-intersecting input-port groups, said plurality of output ports, and a sub-frame from among said non-intersecting sub-frames, and each of said schedulers is cyclically paired with said each control domain during said time-frame.

2. A multi-processor scheduling apparatus for facilitating establishment of a connection in a switch fabric having a plurality of input ports and a plurality of output ports in response to receiving connection requests, said plurality of output ports being divided into non-intersecting output-port groups, said apparatus comprising multiple schedulers individually associated with non-intersecting control domains, each of said control domains being bounded by at least one of:
    a sub-frame of a repetitive time frame divided into non-intersecting sub-frames;
    an input-port group within said plurality of input ports; and
    an output-port group within said plurality of output ports;
each scheduler employing at least one processor and accommodates a connection request within a control domain with which said each scheduler is associated;
wherein each control domain is defined by said plurality of input ports, an output-port group from among said non-intersecting output-port groups, and a sub-frame from among said non-intersecting sub-frames, and each of said schedulers is cyclically paired with said each control domain during said time-frame.

3. A multi-processor scheduling apparatus for establishing a connection in a switch fabric having a plurality of input ports and a plurality of output ports in response to receiving a succession of connection requests, said apparatus comprising:
    a plurality of schedulers, each scheduler employing at least one processor, said schedulers interconnected in a circular pipeline;
    a plurality of domain-state memory devices, each domain-state memory device permanently coupled to a respective scheduler and holds occupancy states of each input port of said plurality of input ports and each output port of said plurality of output ports during a respective sub-frame from among non-intersecting sub-frames of a repetitive time frame; and at least two request buffers, each request buffer holding connection requests and permanently connected to a selected scheduler;

wherein said plurality of schedulers is arranged into scheduler groups and wherein a last scheduler in each scheduler group connects to a request buffer coupled to a scheduler of a subsequent scheduler group.

4. The multi-processor scheduling apparatus of claim 3 wherein said each domain-state memory device comprises a first memory device for holding occupancy state of said each input port during each time slot in said respective sub-frame and a second memory device for holding occupancy state of said each output port during said each time slot.

5. The multi-processor scheduling apparatus of claim 3 further comprising a request distributor for cyclically distributing connection requests originating from said plurality of input ports to individual request buffers of said at least two request buffers.

6. The multi-processor scheduling apparatus of claim 3 wherein each said connection request specifies an input port among said plurality of input ports, an output port among said plurality of output ports, and a number of time slots within said repetitive time frame, and wherein each scheduler produces one of:

an indication of allocated time slots; and
parameters of a scheduling request to be cascaded to a subsequent scheduler.

7. An apparatus for establishing a connection in a switch fabric having a plurality of input ports and a plurality of output ports in response to receiving a succession of connection requests, said apparatus comprising:

a plurality of request buffers, each request buffer receiving connection requests from at least one input port;

a plurality of domain-state memory devices, each domain-state memory device holding occupancy states of each input port of said plurality of input ports and each output port of said plurality of output ports during a respective sub-frame from among non-intersecting sub-frames of a repetitive time frame;

a plurality of schedulers, each scheduler permanently coupled to a respective request buffer and cyclically coupled to said each domain-state memory device; and an equalizing request distributor for equitably offering scheduling requests received from said plurality of input ports to request buffers of said plurality of request buffers so that processing loads are equalized among schedulers of said plurality of schedulers.

8. An apparatus for establishing a connection in a switch fabric having a plurality of input ports and a plurality of output ports in response to receiving a succession of connection requests, said apparatus comprising:

a plurality of request buffers, each request buffer receiving connection requests from at least one input port;

a plurality of domain-state memory devices, each domain-state memory device holding occupancy states of each input port of said plurality of input ports and each output port of said plurality of output ports during a respective sub-frame from among non-intersecting sub-frames of a repetitive time frame; and a plurality of schedulers, each scheduler permanently coupled to a respective request buffer and cyclically coupled to said each domain-state memory device;

wherein said plurality of input ports is partitioned into a number of input-port groups each input-port group including a respective predefined number of input ports and wherein said each input-port group sends connection requests directed to said plurality of output ports to a respective request buffer among said plurality of request buffers.

9. An apparatus for establishing a connection in a switch fabric having a plurality of input ports and a plurality of output ports in response to receiving a succession of connection requests, said apparatus comprising:

a plurality of request buffers, each request buffer receiving connection requests from at least one input port;

a plurality of domain-state memory devices, each domain-state memory device holding occupancy states of each input port of said plurality of input ports and each output port of said plurality of output ports during a respective sub-frame from among non-intersecting sub-frames of a repetitive time frame; and a plurality of schedulers, each scheduler permanently coupled to a respective request buffer and cyclically coupled to said each domain-state memory device;

wherein said plurality of output ports is partitioned into a number of output-port groups each output-port group including a respective predefined number of output ports and wherein said plurality of input ports sends connection requests directed to said each output-port group to a respective request buffer among said plurality of request buffers.

10. The apparatus of claim 7 further comprising a cyclic connector for cyclically connecting said each scheduler to said each domain-state memory device.

11. A method of concurrent scheduling of multiple connections implemented by multiple processors coupled to a switch fabric, the method comprising:

defining a set of non-intersecting control domains, each control domain bounded by a set of input ports among a plurality of input ports of said switch fabric, a set of output ports among a plurality of output ports of said switch fabric, and a set of time slots within a predefined repetitive time frame;

storing occupancy states of input ports of said set of input ports and occupancy states of output ports of said set of output ports of said each control domain during said set of time slots in a respective domain-state memory device among a plurality of domain-state memory devices;

coupling said respective domain-state memory device to a respective scheduler from among a plurality of schedulers each employing at least one processor;

cyclic pairing of each request buffer, among a plurality of request buffers holding connection requests, and each domain-state memory device of said plurality of domain-state memory devices; and allocating multiple connection requests to different schedulers among said plurality of schedulers.

12. The method of claim 11 further comprising cascading schedulers of said plurality of schedulers to form a circular pipeline thereby enabling said cyclic pairing of said each request buffer and said each domain-state memory with permanent coupling of said respective domain-state memory device to said respective scheduler.

13. The method of claim 11 wherein said coupling is cyclical with each domain-state memory device connecting to each scheduler during a repetitive scheduling cycle, thereby enabling said cyclic pairing of said each request buffer and said each domain-state memory device.

14. The method of claim 11 further comprising selecting a duration of said repetitive scheduling cycle to be an integer multiple of a duration of said repetitive time frame.

15. The method of claim 11 further comprising cyclically distributing connection requests originating from said plurality of input ports among request buffers of said plurality of request buffers.

16. The method of claim 11 further comprising equitably distributing connection requests originating from said plurality of input ports among request buffers of said plurality of request buffers according to requisite processing efforts of individual connection requests.

17. The method of claim 11 further comprising one-to-one mapping of scheduled time slots to real-time slots in order to space scheduled time slots of each connection requiring multiple time slots per time frame.

* * * * *